US011874133B2

(12) United States Patent
Houseago et al.

(10) Patent No.: US 11,874,133 B2
(45) Date of Patent: Jan. 16, 2024

(54) MAPPING AN ENVIRONMENT USING A STATE OF A ROBOTIC DEVICE

(71) Applicant: Imperial College Innovations Limited, London (GB)

(72) Inventors: Charles Fletcher Houseago, London (GB); Michael Bloesch, London (GB); Stefan Leutenegger, Munich (DE)

(73) Assignee: Imperial College Innovations Limited, London (GB)

( * ) Notice: Subject to any disclaimer, the term of this patent is extended or adjusted under 35 U.S.C. 154(b) by 258 days.

(21) Appl. No.: 17/384,301

(22) Filed: Jul. 23, 2021

(65) Prior Publication Data

US 2021/0349469 A1 Nov. 11, 2021

Related U.S. Application Data

(63) Continuation of application No. PCT/GB2020/050083, filed on Jan. 15, 2020.

(30) Foreign Application Priority Data

Jan. 24, 2019 (GB) ...................................... 1901006

(51) Int. Cl.
*G05D 1/02* (2020.01)
*G06T 7/579* (2017.01)
(Continued)

(52) U.S. Cl.
CPC ........ *G01C 21/3804* (2020.08); *B25J 9/1653* (2013.01); *B25J 9/1697* (2013.01); *B25J 13/089* (2013.01); *G06T 7/70* (2017.01)

(58) Field of Classification Search
CPC ... G01C 21/3804; B25J 9/1653; B25J 9/1697; B25J 13/089; B25J 9/00; B25J 9/0003;
(Continued)

(56) References Cited

U.S. PATENT DOCUMENTS 10,571,926 B1 * 2/2020 Zhang ................. G05D 1/0274
2012/0155775 A1 6/2012 Ahn et al.
(Continued)

FOREIGN PATENT DOCUMENTS

GB 2538751 A * 11/2016 .......... G06T 15/205
GB 2551609 A 12/2017
(Continued)

OTHER PUBLICATIONS

United Kingdom Combined Search and Examination report dated Jul. 22, 2019 for United Kingdom Application No. GB 1901006.5.
(Continued)

*Primary Examiner* — Jonathan L Sample
*Assistant Examiner* — Byron Xavier Kasper
(74) *Attorney, Agent, or Firm* — EIP US LLP

(57) ABSTRACT

Certain examples described herein enable a robotic device to accurate map a surrounding environment. The robotic device uses an image capture device and at least one of the image capture device and the robotic device move within the environment. Measurements associated with movement of at least one of the image capture device and the robotic device are used to determine a state of the robotic device. The state of the robotic device models the image capture device and the robotic device with respect to a model of the environment that is constructed by a mapping engine. By comparing the state of the robotic device with a measured change in the robotic device, an accurate representation of the state of the robotic device may be constructed. This state is used by the mapping engine to update the model of the environment.

20 Claims, 11 Drawing Sheets

(51) Int. Cl.
*G06T 17/30* (2006.01)
*G01C 21/00* (2006.01)
*G06T 7/70* (2017.01)
*B25J 9/16* (2006.01)
*B25J 13/08* (2006.01)

(58) Field of Classification Search
CPC ...... B25J 9/1664; B25J 9/1661; B25J 9/1694; B25J 13/088; B25J 19/023; B25J 19/025; B25J 19/04; G06T 7/70; G06T 7/579; G06T 17/30; G05D 1/0246; G05D 2201/0207; G05D 1/0272; G05D 1/0274; G05D 1/0094; G05D 1/02; G05D 1/0253; G05B 2219/40298; G05B 1/00; G05B 11/011; G05B 11/06; G05B 11/32; G05B 13/00; G05B 13/021; G05B 13/024; G05B 2219/24128; G05B 2219/35408; G05B 2219/39044; B25K 19/021
See application file for complete search history.

(56) References Cited

U.S. PATENT DOCUMENTS

| | | |
|---|---|---|
| 2015/0163993 A1 | 6/2015 | Pettersson |
| 2016/0144505 A1 | 5/2016 | Fong et al. |
| 2016/0154408 A1 | 6/2016 | Eade et al. |
| 2016/0188977 A1* | 6/2016 | Kearns ................ G06V 40/172 |
| | | 348/113 |
| 2018/0082435 A1 | 3/2018 | Whelan et al. |
| 2018/0293543 A1* | 10/2018 | Tiwari ................ G05D 1/0274 |
| 2019/0035100 A1* | 1/2019 | Ebrahimi Afrouzi ... G01S 17/86 |
| 2019/0080190 A1* | 3/2019 | Shieh ................... G06V 20/46 |

FOREIGN PATENT DOCUMENTS

| | | | |
|---|---|---|---|
| JP | 2017224280 A | * 12/2017 | |
| WO | WO-2012142587 A1 | * 10/2012 | ........... B25J 11/002 |
| WO | 2016189274 A1 | 12/2016 | |

OTHER PUBLICATIONS

International Search Report and Written Opinion dated May 8, 2020 for PCT International Application No. PCT/GB2020/050083.

Laidlow et al., "Dense RGB-D-Inertial SLAM with Map Deformations", 2017 IEEE / RSJ International Conference on Intelligent Robots and Systems (Iros), IEEE, Sep. 24, 2017, pp. 6741-6748, XP033266742.

Leutenegger et al., "Keyframe-Based Visual-Inertial SLAM Using Nonlinear Optimization", Robotics: Science and Systems 2013, Berlin, Germany, Jun. 24, 2013.

* cited by examiner

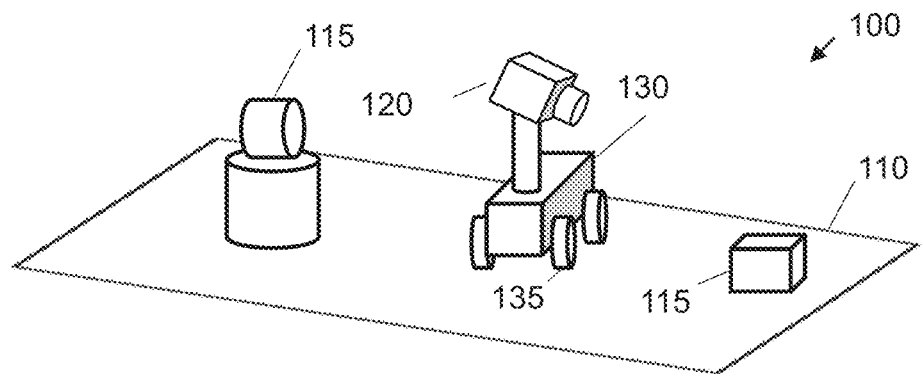
Fig. 1A
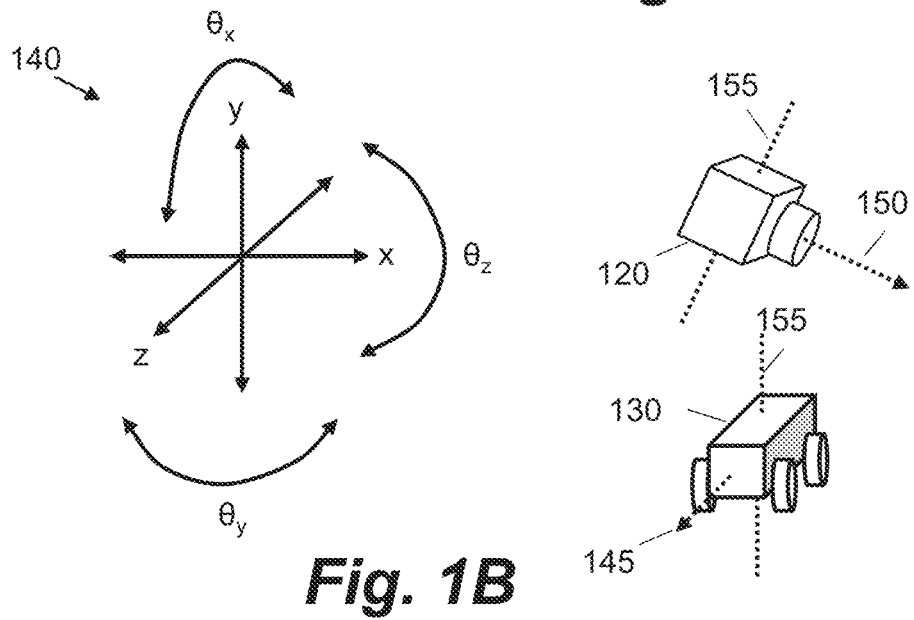
Fig. 1B
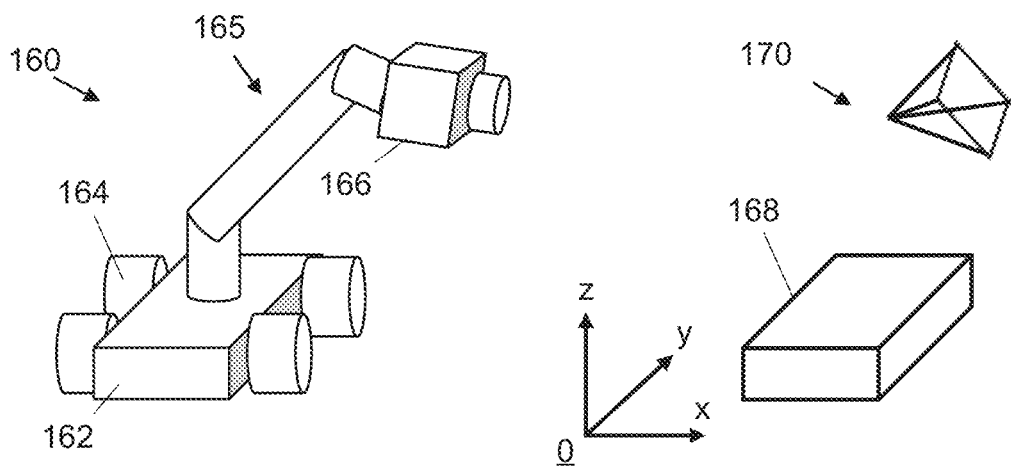
Fig. 1C          Fig. 1D

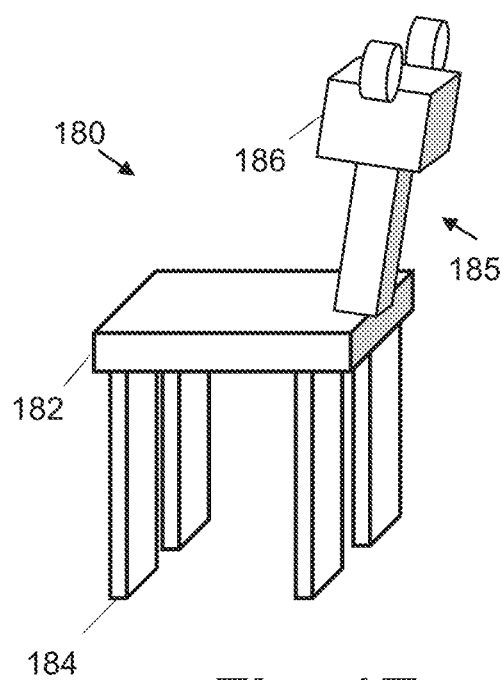
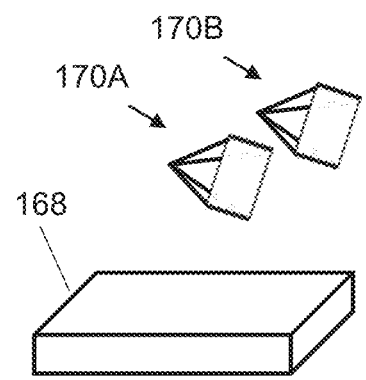
*Fig. 1E*          *Fig. 1F*
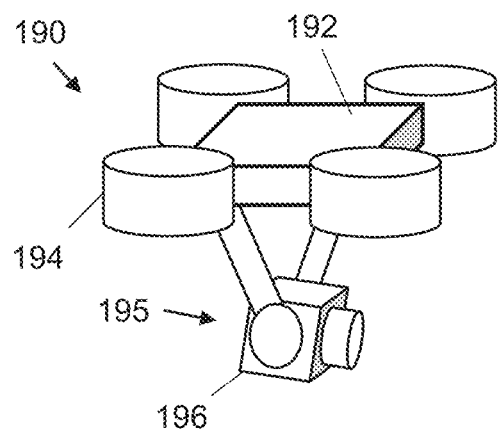
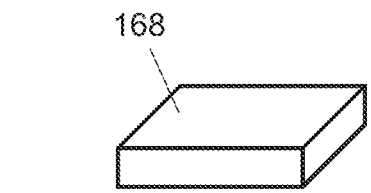
*Fig. 1G*          *Fig. 1H*

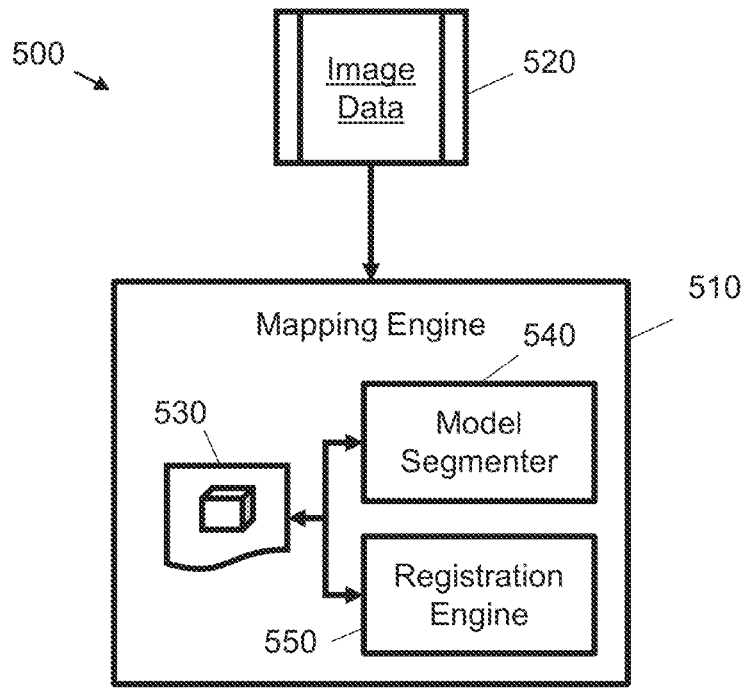
*Fig. 5*
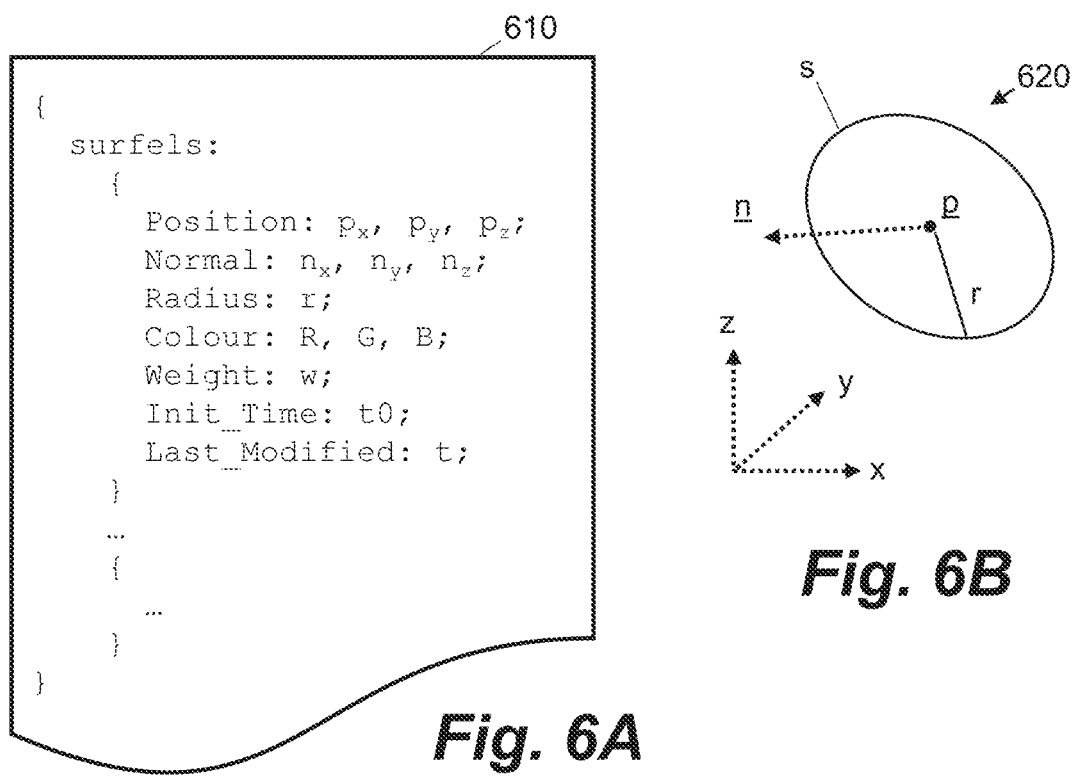
*Fig. 6A*
*Fig. 6B*

MAPPING AN ENVIRONMENT USING A STATE OF A ROBOTIC DEVICE

CROSS-REFERENCE TO RELATED APPLICATIONS

This application is a continuation of International Application No. PCT/GB2020/050083, filed Jan. 15, 2020 which claims priority to UK Application No. GB1901006.5, filed Jan. 24, 2019, under 35 U.S.C. § 119(a). Each of the above referenced patent applications is incorporated by reference in its entirety.

BACKGROUND

Field of the Invention

The present invention relates to mapping an environment using a robotic device. The invention has particular, but not exclusive, relevance to generating a model of the environment using a state of the robotic device, where the state is updated based on measurements as the robotic device moves within the environment.

Description of the Related Technology

In the field of computer vision and robotics, there is often a need to construct a representation of an environment, such as a three-dimensional space that is navigable using a robotic device. Constructing a representation of a three-dimensional space allows a real-world environment to be mapped to a virtual or digital realm, where a map of the environment may be used and manipulated by electronic devices. For example, a moveable robotic device may require a representation of a three-dimensional space to allow simultaneous location and mapping (often referred to as "SLAM"), and thus navigation of its environment. The robotic device may operate in an indoor domestic or commercial environment or an outdoor natural environment. A representation of an environment may enable models of objects within that space to be identified and/or extracted. These may be used to perform measurements on a real-world environment and/or used to produce three-dimensional replications, e.g. via additive manufacturing systems. Similarly, detection of parts of the human body in a three-dimensional space may enable novel man-machine interactions, enabling virtual representations of objects to be manipulated using actions in the physical world.

There are several techniques available for constructing a representation of an environment. For example, structure from motion and multi-view stereo are two techniques that may be used to do this. Many techniques extract features from images of the environment, which are then correlated from image to image to build a three-dimensional representation. Certain techniques that use a reduced number of points or features to generate a representation are referred to as "sparse" techniques. For example, these techniques may use ten to a hundred features and/or points to generate the representation. These may be contrasted with "dense" techniques that generate representations with many thousands or millions of points. "Sparse" techniques have an advantage that they are easier to implement in real-time, e.g. at a frame rate of 30 frames-per-second or so; using a limited number of points or features limits the extent of the processing that is required to construct the three-dimensional representation. Comparatively it is more difficult to perform real-time "dense" mapping of an environment due to computational requirements. For example, it is often preferred to carry out a "dense" mapping off-line, e.g. it may take 10 hours to generate a "dense" representation from 30 minutes of provided image data.

When generating a representation of an environment from a moving capture device, there are the challenges of determining the position and orientation of the capture device within the space, and of dealing with unpredictable motion, e.g. extended "choppy" or "loopy" motion. For example, non-even terrain and operational conditions may result in frequent changes in capture device position and orientation, and an autonomous robotic device may revisit previously captured locations within the three-dimensional space. The capture of image data may also be continuous in real-time, resulting in large amounts of captured data. These factors all present a challenge for real-world systems; many techniques may show success with limited data or tightly-defined capture trajectories but struggle with constructing a representation in real-time from a mobile robotic device.

Stefan Leutenegger et al in their paper "Keyframe-Based Visual-Inertial SLAM Using Nonlinear Optimization", Robotics: Science and Systems 2013, Berlin, Germany, Jun. 24-28, 2013, describe methods to fuse visual and inertial cues in a SLAM system. The paper describes the use of an Inertial Measurement Unit (IMU), which contains a series of accelerometers and gyroscopes to measure forces experienced by a robotic device. However, in practice, use of an IMU as proposed in the paper has been found to suffer from drift and degradation, which causes issues when constructing three-dimensional models. The proposed solution also operates on key-frames and requires a pose-graph based mapping system; it has to build a consistent world model from key-frames that may present different views of a scene and the objects within it. There is also a problem that the modelling is underdefined.

WO 2016/189274 A1 describes methods of modelling a three-dimensional space. Image data from at least one capture device is used to generate a three-dimensional model of the three-dimensional space. In certain examples, the three-dimensional model is segmented into active and inactive portions based on at least one model property. The examples are configured to use the active portions to update the three-dimensional model over time. Registration is also performed to align active portions of the three-dimensional model with inactive portions of the three-dimensional model over time. The registration aligns active portions of the three-dimensional model generated following an observation of a region of the three-dimensional space with inactive portions of the model generated following at least one previous observation of said region.

The methods of WO 2016/189274 A1 operate without a pose graph. This makes them incompatible with previous approaches, such as those presented by Leutenegger et al, that build a pose graph while mapping the environment. While the methods presented in WO 2016/189274 A1 provide improvements for building a model of an environment, applying them to certain real-world robotic devices has been problematic. For example, certain robotic devices do not move in a smooth manner, e.g. they often have an image path that differs from a smooth path traced by a hand-held device. They also often traverse non-planar landscapes that result in jerky camera movements. It has been found that in certain circumstances even the implementations of WO 2016/189274 A1 struggle to process images from these robotic devices in real-time.

SUMMARY

According to one aspect of the present invention there is provided a mapping system for a robotic device, the robotic device comprising one or more actuators to move the robotic device within an environment and a moveable mount for an image capture device. The mapping system comprises a state engine to jointly optimise a current state of the robotic device and a previous state of the robotic device based on a kinematic error, an odometric error and a geometric error. Each state of the robotic device comprises data indicating a pose of the robotic device with respect to a model of the environment and data indicating a pose of the image capture device with respect to the model. The kinematic error comprises a function of a kinematic measurement associated with the moveable mount and a pose of the image capture device with respect to the robotic device derived from the current state. The odometric error comprises a function of an odometry measurement associated with the one or more actuators and an odometric difference between the current state and the previous state. The geometric error comprises a comparison of image data from the capture device and the model of the environment, the comparison using a projection based on the current state. The mapping system is configured to update the model using the current state following optimisation by the state engine.

In certain examples, the moveable mount comprises a plurality of joints and the pose of the image capture device with respect to the robotic device is determined using forward kinematics.

In certain examples, the pose of the robotic device with respect to the model and the pose of the image capture device with respect to the model are defined within six degrees of freedom.

In certain examples, the state engine is configured to jointly optimise the current state and the previous state using a linear prior, the state engine being configured to update the linear prior following optimisation based on a marginalisation of the kinematic error, the odometric error, the geometric error and the previous state. In such examples, the mapping engine may be configured to use a deformation graph to align a first set of portions of the model with a second set of portions of the model, the deformation graph indicating a set of neighbours for a given position in the model that are to be used to modify the model at the given position during alignment. In these examples, the mapping engine may be configured to align the first set of portions of the model with the second set of portions of the model during a loop closure, wherein, following the loop closure, the linear prior and the previous state are reinitialised.

In certain examples, the model comprises a surface element model, wherein each surface element in the surface element model comprises at least data defining a position of the surface element in three-dimensions and data defining a normal vector for the surface element in three-dimensions, wherein each surface element represents a two-dimensional area in a three-dimensional space.

In certain examples, the mapping system is configured to generate the model without a pose graph for the image capture device.

According to a second aspect of the present invention, there is provided a robotic device comprising: an image capture device moveably mounted with respect to the robotic device; one or more actuators to move one or more of the robotic device and the image capture device with respect to an environment; a state engine to update a state of the robotic device; and a mapping engine to generate a three-dimensional model of the environment using the state of the robotic device. The state of the robotic device comprises at least a transformation of the image capture device with respect to the three-dimensional model. The state engine is configured to update the state of the robotic device based on a comparison of the state of the robotic device and measurements obtained from the one or more actuators. The mapping engine is configured to compare an image from the image capture device with the three-dimensional model based on the state of the robotic device to update the three-dimensional model.

In certain examples, the mapping engine is configured to determine an iterative-closest-point error, and wherein the state engine is configured to additionally use the iterative-closest-point error to update the state of the robotic device.

In certain examples, the one or more actuators comprise: a first set of actuators to move the robotic device with respect to the environment, and a second set of actuators to move the image capture device with respect to the robotic device, wherein the state of the robotic device further comprises a transformation of the robotic device with respect to the three-dimensional model. In such examples, the first set of actuators may provide a plurality of degrees of freedom between the robotic device and the environment and the second set of actuators may provide a plurality of degrees of freedom between the image capture device and the robotic device.

In certain examples, the image capture device is configured to output colour image data and a depth map, and the mapping engine is configured to use the colour image data and the depth map to update the three-dimensional model.

According to a third aspect of the present invention there is provided a method of updating a three-dimensional model of an environment using a robotic device having a moveably-coupled image capture device. The method comprises instructing a movement of at least one of the image capture device and the robotic device within the environment; obtaining image data representing an observation of the environment with the image capture device; obtaining a measurement of the movement; updating a model state of the robotic device, the model state of the robotic device comprising pose data for the robotic device and the image capture device, the updating comprising optimising a function of the model state and the measurement of the movement; and updating the three-dimensional model of the environment based on a comparison of the image data and the three-dimensional model using the updated model state, the comparison comprising a projection using the updated model state.

In certain examples, the pose data comprises a transformation of the robotic device with respect to the three-dimensional model and a transformation of the image capture device with respect to at least one of the robotic device and the three-dimensional model.

In certain examples, instructing a movement comprises one or more of: instructing a first set of actuators to move the robotic device within the environment; and instructing a second set of actuators to move the image capture device with respect to the robotic device. In these examples, obtaining a measurement of movement from the robotic device comprises one or more of: obtaining odometry data from the first set of actuators; and obtaining kinematics data from the second set of actuators.

In certain examples, updating the model state of the robotic device and the image capture device comprises optimising a cost function, the cost function comprising an error term associated with a kinematic error and an error term associated with an odometric error. In such examples, the kinematic error comprises a comparison of the spatial relationship between the image capture device and the robotic device and a kinematic measurement from the robotic device, and the odometric error comprises a comparison of a change in the spatial relationship between the robotic device and the three-dimensional model of the environment and odometry data from the robotic device. In these examples, the cost function may comprise an error term associated with a linear prior, wherein the linear prior is constructed using error values and the model state of the robotic device from a previous update operation. In these examples, the cost function may comprise an error term associated with a geometric alignment error, wherein the geometric alignment error comprises a comparison of depth data derived from the obtained image data and the three-dimensional model using the model state of the robotic device before the updating.

According to a fourth aspect of the present invention, there is provided a non-transitory computer-readable storage medium comprising computer-executable instructions which, when executed by a processor, cause a computing device to perform any of the methods described above.

Further features and advantages of the invention will become apparent from the following description of preferred embodiments of the invention, given by way of example only, which is made with reference to the accompanying drawings.

BRIEF DESCRIPTION OF THE DRAWINGS

FIG. 1A is a schematic diagram showing a first example of an environment to be mapped;

FIG. 1B is a schematic diagram showing available degrees of freedom for example devices;

FIGS. 1C and 1D are schematic diagrams respectively showing a robotic device according to a first example and a state for that robotic device;

FIGS. 1E and 1F are schematic diagrams respectively showing a robotic device according to a second example and a state for that robotic device;

FIGS. 1G and 1H are schematic diagrams respectively showing a robotic device according to a third example and a state for that robotic device;

FIG. 5 is a schematic diagram showing certain components of a mapping engine according to an example;

FIG. 6A is a schematic diagram showing example data for a three-dimensional surface element model;

FIG. 6B is a schematic diagram showing attributes of a surface element according to an example;

DETAILED DESCRIPTION

Figure 2A:
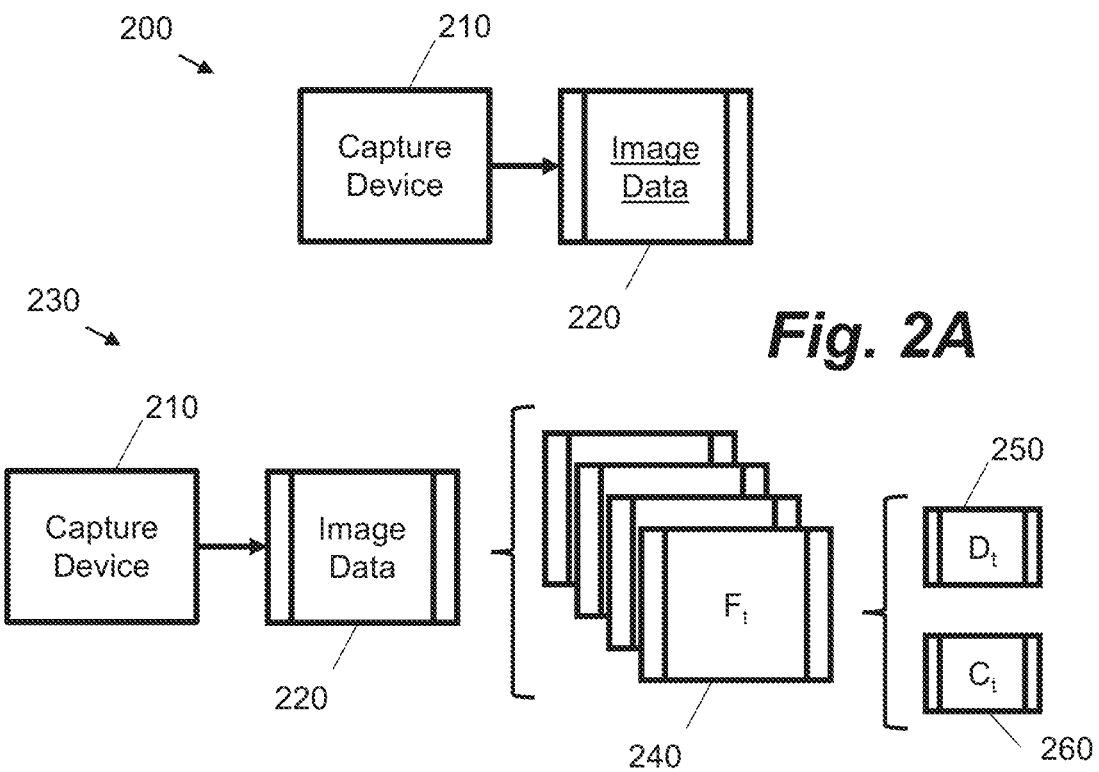
FIGS. 2A to 2C are schematic diagrams showing example capture devices.

Certain examples described herein enable a robotic device to accurate map a surrounding environment. The robotic device comprises an image capture device and at least one of the image capture device and the robotic device move within the environment. Measurements associated with at least one of the image capture device and the robotic device, e.g. measurements of the movement of the image capture device with respect to the robotic device or the robotic device with respect to the environment, are used to determine a state of the robotic device. The state of the robotic device models the image capture device and the robotic device with respect to a model of the environment that is constructed by a mapping engine. The state may be updated using measurements associated with the robotic device. This state is used by the mapping engine to update the model of the environment. By improving an accuracy of a state of a robotic device, a mapping accuracy may be improved.

Certain examples described herein may be applied to robotic devices with complex mechanical mounts for one or more image capture devices. They may also be applied to robotic devices that navigate complex interior and/or exterior environments, with non-planar surfaces. In these applications, the described examples provide systems and methods that are able to maintain accurate mapping of the environment. They thus offer improvements for mapping in areas such as autonomous search and rescue and disaster recovery. These are areas where many comparative approaches struggle to provide accurate mapping.

Certain examples described herein may be integrated with mapping systems that do not use a pose graph. They are thus able to build upon their accuracy in the mapping of three-dimensional spaces, e.g. their proven applicability in indoor scene mapping using hand-held devices. They allow these approaches to be used robustly in a wider range of scenarios and environments.

In certain examples, dense, consistent and comprehensive models of a three-dimensional space may be generated from "loopy" and/or "choppy" capture device trajectories that result from a robotic device having a moveable mount of an image capture device. Certain examples described herein comprise features that enable state optimisation and model construction to occur in real-time or at near real-time frame rates. For example, certain features enable incremental simultaneous localisation and dense mapping on a frame-by-frame basis, e.g. without using key-frame-based approaches that introduce certain issues and that can reduce mapping accuracy.

In certain examples, a three-dimensional model or map (referred to as a "model" herein) is segmented into at least active and inactive portions based on at least one property of the model. For example, positional elements of such a model may be classified as active or inactive based on a time of model modification, e.g. older parts of the model may be classified as inactive, and/or a distance from a capture device within the three-dimensional space, e.g. positional elements that are over a certain distance from the capture device or a defined location in space may be classified as inactive. In these cases, active portions of the three-dimensional model are used to update said model, wherein inactive portions are not used to update the model. This updating may comprise fusing frames of image data with the model, e.g. determining new positional elements in the model from the image data.

Certain examples described herein also provide for alignment of active and inactive model portions. This enables so-called "loop" closures when a capture device revisits or re-observes a given location within the three-dimensional space. This alignment, which may be performed as frequently as on a frame-by-frame basis as captured image data is processed, and the accurate tracking of a state of a robotic device maintains the accuracy and stability of the model and provides the ability to robustly cope with "loopy" and/or "choppy" capture device trajectories, as captured by real-world robotic devices with moveable camera mounts. In certain cases, the alignment may incorporate two aspects: a "local loop closure" that attempts to align predicted frames generated from each of the active and inactive models; and a "global loop closure" that attempts to align a given frame of image data with a representation of a previously-processed frame of image data. Alignment may be performed by deforming the model, e.g. via a space deformation. In certain cases, this deformation may be non-rigid and may use a deformation graph to apply a transformation to positional elements of the model. This may further increase the accuracy and consistency of the model in three-dimensions, e.g. by reducing discontinuities that are constructs of the modelling process and that do not reflect the three-dimensional space being modelled. In particular, such a deformation graph may be sparse and/or may be embedded in the space, e.g. be associated with the positional elements of the model. These techniques differ from those that require a pose graph, e.g. a probabilistic representation of the location and orientation of the camera device, which is used to rigidly transform independent key frames of image data.

Certain examples described herein provide a tracking functionality based on movement measurements such as kinematic and odometric measurements. Accuracy may be further improved by incorporating a constraint based on a geometric error. A kinematic error may be defined with respect to an image capture device that is moveably mounted on a robotic device. An odometric error may be defined to constrain a pose of the robotic device with respect to both a previous and current state of the robotic device. In certain cases, tracking may be performed for video data on a frame-by-frame basis, where a state graph that comprises previous and current state components is solved as each frame is received. Previous states and errors may be marginalised into a linear prior, which may also constrain state estimates. Loop closures as described above may be handled. For loop closures, a consistent model may be maintained by smoothly deforming the model and then updating at least a previous state of the robotic device.

FIGS. 1A, 1B and 1C schematically show examples of an environment and the capture of image data associated with that environment. These examples are presented to better explain certain features described herein and should not be considered limiting; certain features have been omitted and simplified for ease of explanation.

FIG. 1A shows an example 100 of an environment in the form of a three-dimensional space 110. The three-dimensional space 110 may be an internal and/or an external physical space, e.g. at least a portion of a room or geographical location. The three-dimensional space 110 may be a location on a planet. The three-dimensional space 110 in this example 100 comprises a number of physical objects 115 that are located with the three-dimensional space. These objects 115 may comprise one or more of, amongst others: people, electronic devices, furniture, animals, building portions and equipment. The example 100 also shows an image capture device 120 that is capturing image data associated with the three-dimensional space 110. The image capture device 120 may comprise a camera, either in digital or analogue form, that is arranged to record data that results from observing the three-dimensional space 110. In FIG. 1A, the image capture device 120 is mounted on a robotic device 130 that is arranged to navigate the three-dimensional space 110 using actuators 135. In the present example, these actuators comprise wheels; in other cases, they may comprise tracks, burrowing mechanisms, legs, rotors, etc. For example, the robotic device 130 may comprise a controlled or an autonomous aerial and/or terrestrial device or vehicle. Although the three-dimensional space 110 in FIG. 1A is shown with a lower surface this need not be the case in all implementations, for example an environment may be aerial or within extra-terrestrial space. In FIG. 1A, the image capture device 120 is moveably mounted on the robotic device 130. For example, the image capture device 120 may be mechanically coupled to the robotic device 130, wherein the robotic device is arranged to move within the three-dimensional space 110.

FIG. 1B shows an example 140 of degrees of freedom available to an example image capture device 120 and an example robotic device 130. In the case of the image capture device 120, a direction 150 of the image capture device 120 may be co-linear with the axis of a lens or other imaging apparatus. As an example of rotation about one of the three axes, a normal axis 155 is shown in the Figure. Similarly, in the case of robotic device 130, a direction of alignment of the robotic device 145 may be defined. This may indicate a facing of the robotic device and/or a direction of travel. A normal axis 155 is also shown. Although only a single normal axis is shown with reference to the image capture device 120 or robotic device 130, these devices may rotate around any one or more of the axes shown schematically as 140 as described below.

More generally, a position and an orientation of a device may be defined in three-dimensions with reference to six degrees of freedom: a position or location may be defined within each of the three dimensions, e.g. by an [x, y, z] co-ordinate, and an orientation may be defined by an angle vector representing a rotation about each of the three axes, e.g. $[\theta_x, \theta_y, \theta_z]$. In examples described herein the position and the orientation of a device is defined as the pose of the device. The pose of a device may vary over time, such that a device may have a different pose at a time t+1 than at a time t. This may apply to both the image capture device and the robotic device. The pose of a device may also change over time, e.g. as the robotic device moves around within an environment or as the image capture device moves in relation to the robotic device. This is described further with reference to FIGS. 1C to 1H below.

FIGS. 1C to 1H show three example robotic devices 160, 180 and 190. These robotic devices are illustrative examples, the methods and systems described herein may be applied to robotic devices with a wide variety of configurations and constructions.

FIG. 1C shows a first example of a robotic device 160. The robotic device 160 comprises a chassis 162, a set of actuators 164, a moveable mount 165 and an image capture device 166. The set of actuators 164 in this example comprise a set of wheels. The moveable mount 165 is mechanically coupled to the chassis 162 at one end and to the image capture device 166 at the other end (at an "end-effector" position). The moveable mount 165 provides one or more degrees of freedom for movement of the image capture device 166, e.g. with reference to the chassis 162 of the robotic device 160. The moveable mount 165 in FIG. 1C comprises a plurality of joints. The exact configuration of the moveable mount 165, and the range of possible movements at each joint, may vary from device to device. In this example, the moveable mount enables the image capture device 166 to have a position and an orientation that differs from the chassis 162 of the robotic device 160. The set of actuators 164 allow the chassis 162 of the robotic device 160 to have a varying position and orientation within a surrounding environment. As such, each of the chassis 162 and the image capture device 166 may have a different state represented by up to six variables, e.g. the state of each of the chassis 162 and the image capture device 166 may be defined by a matrix indicating a co-ordinate in a three-dimensional space and a set of rotations about each axis in the space. The three-dimensional space may be defined in relation to a model used by the robotic device to navigate the environment. In one case, the moveable mount may comprise an arm or manipulator mounted onto an omnidirectional robotic device. In this case, the robotic device may be moveable in an arbitrary direction on a surface of fairly constant elevation.

FIG. 1D shows how a state of the robotic device 160 may be modelled. FIG. 1D shows a model space that has a defined co-ordinate system. The model space may be a three-dimensional Euclidean space defined by the axes illustrated in FIG. 1B. An origin within the model space may be chosen arbitrary, e.g. may be based on an initial position of a robotic device 160 when the device is activated and/or a calibrated position with respect to one or more objects within the environment (e.g. using encoded data such as a multidimensional barcode). In FIG. 1D the state of the robotic device 160 comprises data 168 that indicates a pose of the robotic device 160 with respect to the model space. In this case the pose of the robotic device 160 is taken as the position and the orientation of a model of the chassis 162 of the robotic device. For example, data 168 may be stored as a transformation—$T_{WB}$—with respect to the origin of the model space for a given point associated with a three-dimensional representation of the chassis 162 (e.g. a corner of a defined cuboid). Here "W" refers to the "World" of the model space, and "B" refers to the base of the robotic device as provided by the chassis 162. In FIG. 1D the state of the robotic device 160 also comprises data 170 that indicates a pose of the image capture device 166 with respect to the model space. In this case, the pose of the image capture device 166 is taken as the position and the orientation of the image capture device 166. In a similar manner to data 168, data 170 may be stored as a transformation—$T_{WC}$—with respect to the origin of the model space for a given point associated with a three-dimensional representation of the image capture device 166. Again, "W" refers to the "World" of the model space and "C" refers to the capture device. The pose of the image capture device 166 may be represented as the position of a co-ordinate system for the image capture device with respect to the model space.

FIG. 1E shows a second example of a robotic device 180. The robotic device 180 is constructed as a legged robot having a body 182 and, in this case, four legs 184. Each leg may be powered by a series of actuators. A head 186 of the robotic device 180 is mechanically coupled to the body 182 via a neck 185 that acts as a moveable mount for a plurality of image capture devices that are mounted to the head 186. FIG. 1F shows data 168 defining a pose of the body 182 and data 170A, 170B respectively defining poses for the plurality of image capture devices mounted upon the head 186. In this case, the neck 185 may be moveable and the head 186 may be rotatable upon the neck 185. In certain configurations, the image capture devices may be further moveable upon the head 186.

FIG. 1G shows a third example of a robotic device 190. The robotic device 180 comprises an aerial vehicle (e.g. a "drone"). The robotic device 190 comprises a chassis 192 and four actuators 194. The four actuators may comprise rotor blades to propel the robotic device 190 within an aerial space. The robotic device 190 also comprises a moveable mount 195 in the form of a gimbal that supports an image capture device 196. The moveable mount 195 allows the image capture device 196 to move independently of the chassis 192. FIG. 1H shows data 168 defining a pose of the chassis 168 and data 170 defining a pose for the image capture device 196.

FIGS. 1C, 1E and 1G show some non-limiting examples of the forms that a robotic device may take. FIGS. 1D, 1F and 1H show how a state of the various robotic devices may be represented, i.e. in the form of data 168 representing a pose of the robotic device and data 170 representing a pose of at least one image capture device that is mechanically coupled to the robotic device using a moveable mount. In the present examples, a robotic device and a moveable mount may take a wide number of forms. The moveable mount may comprise one or more actuators to enable movement with respect to the robotic device. The robotic device may also have one or more actuators to enable movement with respect to a surrounding environment. A set of actuators may comprise one or more mechanical, electrical, hydraulic, pneumatic, polymer, thermal and/or magnetic mechanisms, including so-called "soft" actuators that comprise deformable polymers and/or systems that combine different mechanisms to provide movement.

Figure 2B:
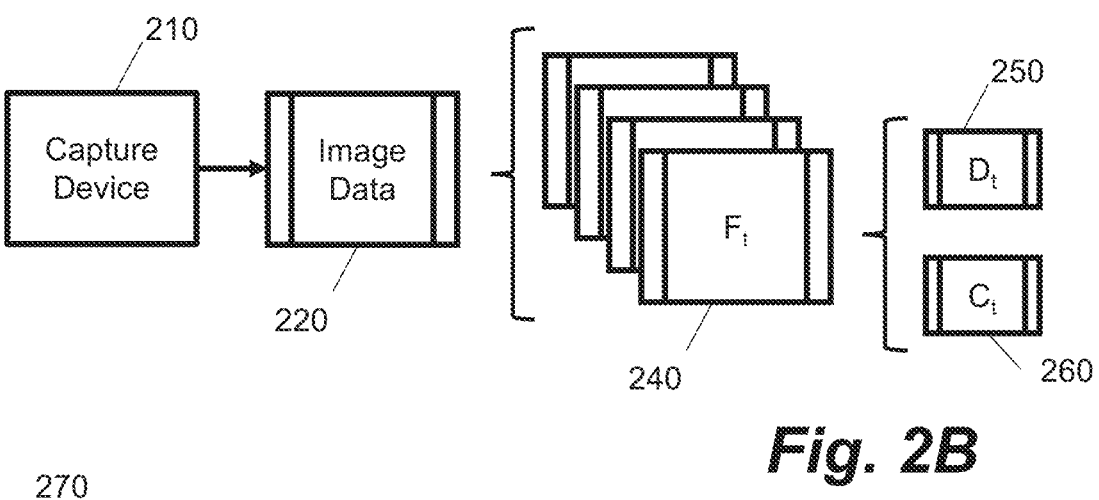
Figure 2C:
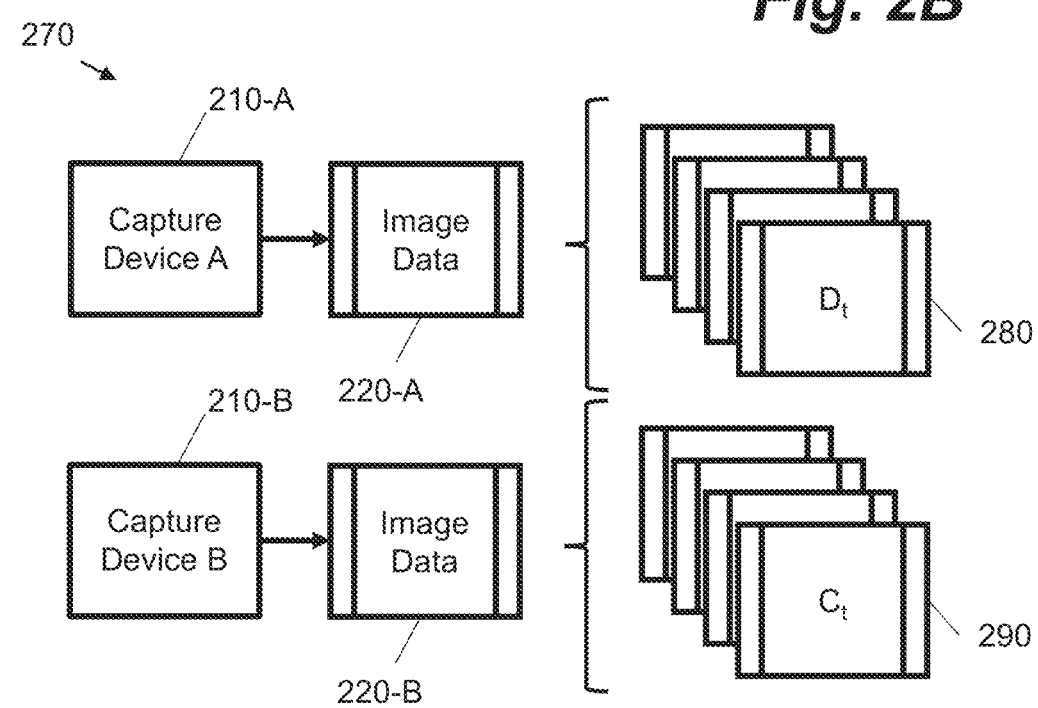

FIGS. 2A, 2B and 2C show schematically three non-exhaustive examples of different image capture device configurations. These configurations may apply to one or more image capture devices that are moveably mounted upon a robotic device. In the example 200 of FIG. 2A, an image capture device 210 is configured to generate image data 220. If the image capture device 210 is a digital camera this may be performed directly, e.g. image data 220 may comprise processed data from a charge-coupled device or complementary metal-oxide-semiconductor (CMOS) sensor. It is also possible to generate image data 220 indirectly, e.g. through processing other image sources such as converting analogue signal sources.

In one case, image data 220 comprises image data captured over time. One example 230 of this format is shown in FIG. 2B. In this case, the image data 220 comprises a plurality of frames 240. Each frame 240 may relate to a particular time t in a time period over which images of an environment, such as environment 110 in FIG. 1, are captured (i.e. $F_t$). As such image data 220 may be considered video data, and the image capture device 210 may be considered to be a video camera. A frame 240 generally consists of a two-dimensional representation of measured data. For example, a frame 240 may comprise a two-dimensional array or matrix of recorded pixel values at time t. In the example of FIG. 2B, all frames 240 within the image data are the same size, although this need not be the case in all examples. Pixel values within a frame 230 represent a measurement of a particular portion of the three-dimensional space of an environment. In the example of FIG. 2B, each frame 240 comprises values for two different forms of image data. A first set of values relate to depth data 250 (e.g. $D_t$). The depth data may comprise an indication of a distance from the capture device, e.g. each pixel or image element value may represent a distance of a portion of the three-dimensional space from the image capture device 210. A second set of values relate to photometric data 260 (e.g. colour data $C_t$. These values may comprise Red, Green, Blue pixel values for a given resolution. In other examples, other colour spaces may be used and/or photometric data 260 may comprise mono or grayscale pixel values. In one case, image data may comprise a compressed video stream or file. In this case, frames of image data may be reconstructed from the stream or file, e.g. as the output of a video decoder. Image data may be retrieved from memory locations following pre-processing of video streams or files.

The image capture device 210 of FIG. 2B may comprise a so-called RGB-D camera that is arranged to capture both RGB data 260 and depth ("D") data 250. In one case, the RGB-D camera is arranged to capture video data over time. One or more of the depth data 250 and RGB data may be used at any one time. The depth data 250 may be generated by one or more techniques known in the art, such as a structured light approach wherein an infrared laser projector projects a pattern of infrared light over an observed portion of a three-dimensional space, which is then imaged by a monochrome CMOS image sensor.

In one case, the image capture device 210 may be arranged to store the image data 220 in a coupled data storage device. The data storage device may be located within one or more of the image capture device 210, a moveable mount coupling the image capture device 210 to a robotic device, and the robotic device. In another case, the image capture device 210 may transmit image data 220 to a coupled computing device. The computing device may be remote from both the image capture device 210 and the robotic device. In other cases, the computing device may comprise an embedded computing device of the robotic device. The coupled computing device may be directly coupled, e.g. via a universal serial bus (USB) connection, or indirectly coupled, e.g. the image data 220 may be transmitted over one or more computer networks. In yet another case, the image capture device 210 may be configured to transmit the image data 220 across one or more computer networks for storage in a network attached storage device. Image data 220 may be stored and/or transmitted on a frame-by-frame basis or in a batch basis, e.g. a plurality of frames may be bundled together. The depth data 240 need not be at the same resolution or frame-rate as the photometric data 250. For example, the depth data 250 may be measured at a lower resolution than the photometric data 260. One or more pre-processing operations may also be performed on the image data 220 before it is used in the later-described examples. Further configurations not described herein are also possible.

FIG. 2C shows another possible configuration 270 to obtain image data 220. In this example, two image capture devices are used: a first image capture device 210-A arranged to capture image data 220-A comprising frames of depth data 280; and a second image capture device 210-B arranged to capture image data 220-B comprising frames of photometric data 290. These data channels may be processed separately in any computing device or merged into a common image processing pipeline. For example, the configuration 270 of FIG. 2C may apply to the configuration of FIG. 1E. In one case, the first image capture device 210-A may be an infrared, ultrasound and/or radar device arranged to measure (e.g. of depth in) a three-dimensional space and convert that measurement into frames of measurement data. The second image capture device 210-B may then comprise an RGB camera arranged to capture frames of colour image data 290. The frame sizes and/or resolutions for the depth data 280 and photometric data 290 may differ, as may the frame rate of capture. In one case, pre-processing may be applied such that the two frame sets have a common size and resolution. In this case, the data of FIG. 2C may be pre-processed such that it is in the form shown in FIG. 2B.

In certain examples, an image capture device may be incorporated into the robotic device, e.g. the robotic device, moveable mount and the image capture device may comprise a single unit. In other examples, the image capture device may be a separable device that is couplable to the robotic device. In certain examples, the moveable mount may be built into the robotic device. In other examples, it may be removably coupled to the robotic device. In certain cases, two or more of the robotic device, the movable mount and the image capture device may be separate modular components that may be coupled to a variety of different devices.

FIGS. 2A, 2B and 2C are provided as a number of examples and, as will be appreciated, different configurations than those shown in the Figures may be used to generate image data 220 for use in the methods and systems described below. Image data 220 may further comprise any measured sensory input that is arranged in a two-dimensional form representative of a captured or recorded view of an environment with an image capture device. For example, this may comprise just one of depth data or photometric data, electromagnetic imaging, ultrasonic imaging and radar output, amongst others. In these cases, only an imaging device associated with the particular form of data may be required, e.g. in one case the image capture device may comprise a monocular RGB device without depth data. Similarly, in certain cases, image data may comprise only depth data, e.g. photometric data such as 260 and 290 may be omitted.

In certain cases, the image capture device may be arranged to perform pre-processing to generate depth data. For example, a hardware sensing device may generate disparity data or data in the form of a plurality of stereo images, wherein one or more of software and hardware are used to process this data to compute depth information. In other cases, image data from a monocular RGB camera may be processed by a reconstruction system to generate depth data. Similarly, depth data may arise from time of flight cameras that output phase images that may be used to reconstruct depth information. In examples that utilise depth data, any suitable technique may be used to generate depth data that forms part of image data 220.

The image data of FIG. 2A and the photometric data $C_t$ of FIGS. 2B and 2C may comprise a colour image, where each [x, y] pixel value in a frame having a resolution of $x_{R1}$ by $y_{R1}$ comprises an RGB vector [R, G, B]. As an example, the resolution may be 640 by 480 pixels. The depth data $D_t$ of FIGS. 2B and 2C may comprise a two-dimensional matrix of depth values. This may be represented as a grayscale image, e.g. where each [x, y] pixel value in a frame having a resolution of $x_{R2}$ by $y_{R2}$ comprises a depth value, d, representing a distance from the capture device of a surface in the three-dimensional space.

In certain cases, image data 220 may be generated by combining multiple data sources, e.g. multiple cameras that are observing a particular three-dimensional space. In certain cases, image data 220 need not be video data. It may instead comprise a series of still images captured from different locations over time using one or more capture devices. In certain cases, depth data may be generated from photometric data, e.g. from processing photometric data representative of motion of the capture device around a space.

The preceding Figures present examples of robotic devices and image capture devices that may be used in conjunction with examples of FIGS. 3A to 8.

Figure 3A:
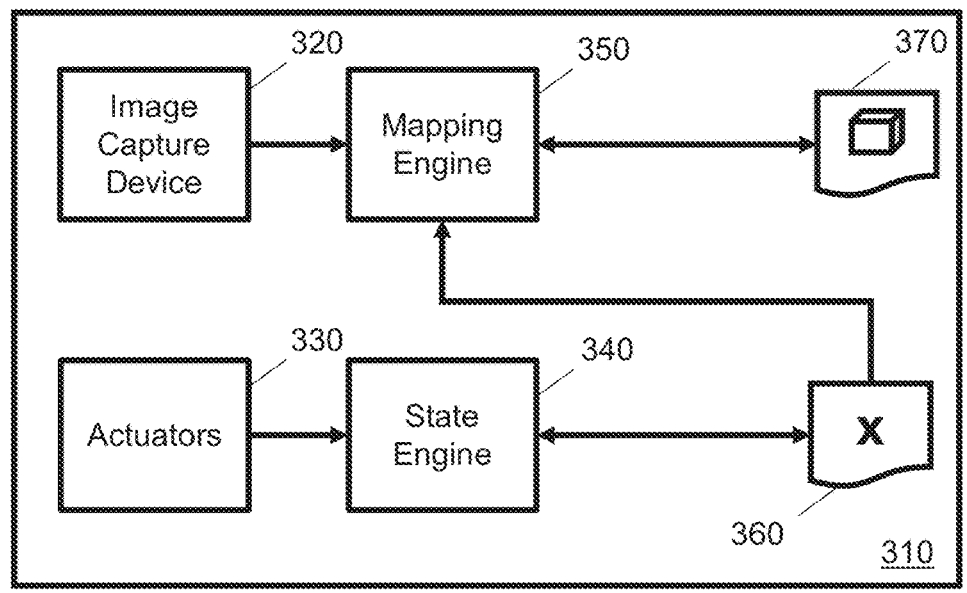
FIG. 3A is a schematic diagram of mapping system for a robotic device according to a first example.

FIG. 3A shows components of a robotic device 310 according to an example. The robotic device 310 may be a device such as one of the robotic devices 120, 160, 180 and 190 of FIGS. 1A to 1H. Although the components of the robotic device 310 are shown as integrated components in the Figure they may be implemented separately and communicatively coupled to the robotic device 310, e.g. as explained earlier with respect to the image capture device 210 of FIGS. 2A to 2C.

In FIG. 3A, the robotic device 310 comprises an image capture device 320, a set of one or more actuators 330, a state engine 340 and a mapping engine 350. The image capture device 320 may be one of the image capture devices 120, 166, 186, and 196 as shown in FIGS. 1A to 1H, one of the image capture devices 210 shown in FIGS. 2A to 2C, or another capture device. The image capture device 320 is configured to capture image data. The set of actuators 330 may comprise actuators such as actuators 164, 184 and 194 and/or those found in the moveable mounts 165, 185 and 195 of FIGS. 1C to 1H. The actuators 330 are configured to move one or more of the robotic device and the image capture device with respect to an environment. For example, the actuators 330 may be configured to move a base or chassis of the robotic device within the environment and/or to move the image capture device 320 with respect to the base or chassis.

The state engine 340 and the mapping engine 350 comprise processing devices for the robotic device 310. The state engine 340 and the mapping engine 350 may comprise dedicated processing electronics and/or may be implemented by way of computer program code executed by a processor of at least one computing device. One or more of the state engine 340 and the mapping engine 350 may be implemented by one or more embedded computing devices, e.g. may comprise separate embedded computing devices or a single common embedded computing device. Each computing device may comprise at least one processor operating in association with memory to execute computer program code loaded onto a computer readable medium. This medium may comprise solid state storage such as an erasable programmable read only memory and the computer program code may comprise firmware. In other cases, one or more of the state engine 340 and the mapping engine 350 may comprise a suitably configured system-on-chip, application-specific integrated circuit and/or one or more suitably programmed field-programmable gate arrays. In certain cases, one or more of the state engine 340 and the mapping engine 350 may be implemented, as well as or instead of the previous cases, by one or more graphical processing units executing computer program code. In certain cases, one or more of the state engine 340 and the mapping engine 350 may be implemented by way of one or more functions implemented in parallel, e.g. on multiple processors and/or cores of a graphics processing unit.

The state engine 340 is configured to determine a state of the robotic device 360. The state of the robotic device 360 may comprise data that is stored in a memory and/or storage device of the robotic device 310. The mapping engine 350 is configured to generate a three-dimensional model of the environment 370 using the state of the robotic device 360.

The three-dimensional model 370 generated by the mapping engine 350 may comprise any model or map having positional elements representative of positions or locations within the three-dimensional space of the environment that is represented within the image data. The three-dimensional model 370 may also comprise data that is stored in a memory and/or storage device of the robotic device 310. In certain cases, the three-dimensional model 370 is a "dense" model of the three-dimensional space. In this case, there are a large number of positional elements forming the model, e.g. hundreds of thousands or millions of elements. This may be compared to a feature-based or "sparse" model wherein there may only be tens or hundreds of defined model points. In one case, the positional elements may be based on a voxel model of the space, wherein surfaces with the space are defined with reference to voxel values within a voxel space of a particular resolution in three dimensions. In another case, a surface element ("surfel") model may be used. The surface element model is defined in more detail with reference to FIGS. 6A and 6B. In a surface element model a number of orientated surfaces at particular positions are defined as positional elements. The extent of the three-dimensional model 370 may depend on the observed extent of the environment by the image capture device 320.

In the example of FIG. 3A, the state of the robotic device 360 comprises at least a transformation of the image capture device 320 with respect to the three-dimensional model 370. For example, the three-dimensional model 370 may represent a "world frame" (represented herein by "W") and the state of the robotic device 360 may comprise a pose of the image capture device 320 (represented herein by "C") in the world frame and a pose of the robotic device 310 (e.g. a base, body, main chassis or other reference point of the robotic device—represented herein by "B") in the world frame. In certain cases, the pose of the image capture device 320 in the world frame may be stored as data representing a translation $_W r_{WC}$ and data representing an orientation $q_{WC}$. Similarly, the pose of the pose of the robotic device 310 in the world frame may be stored as data representing a translation $_W r_{WB}$ and data representing an orientation $q_{WB}$. In this case, the state of the robotic device 360 exists as a defined point on a 12-dimensional manifold.

In the example of FIG. 3A, the state engine 340 is configured to determine the state of the robotic device 360 as the robotic device 310 explores the environment. For example, over time, the positions and orientations of at least one of the image capture device 320 and the robotic device 310 may change in space. Changes may be due to active movements using the one or more actuators 330 and/or noisy perturbations of the image capture device 320 and the robotic device 310 within the environment (e.g. due to slippage, wind, mechanical bounce, uneven surfaces etc.). The state of the robotic device 360 thus needs to be updated to reflect these changes. In the present example, the state engine 340 is configured to update the state of the robotic device 360 based on a comparison of a change in the state of the robotic device and measurements obtained from the one or more actuators 330. In certain cases, the change in the state of the robotic device is determined between two times at which successive images are captured by the image capture device 320. If the image capture device 320 comprises a video camera, then the state engine 340 may update the state of the robotic device 360 on a frame-by-frame basis. In certain cases, the state engine 340 may be configured to perform a state update for a selected subset of captured frames, e.g. every nth frame. As is described in more detail with reference to subsequent examples, in certain cases the state of the robotic device 360 may comprise a current state and a previous state of the robotic device. In these cases, the state engine 340 may be configured to jointly optimise components of the current state and the previous state. For example, this may comprise computing a new updated state and storing an existing current state as a previous state for the next update.

The state engine 340 and the mapping engine 350 of FIG. 3A are configured to work together. In the example of FIG. 3A, the mapping engine 350 is configured to compare an image from the image capture device 320 with a projection of the three-dimensional model 370 based on the state of the robotic device 360, and to use the result of this comparison to update the three-dimensional model 370. The projection may comprise the generation of a synthetic image that represents a two-dimensional view of the model from a current pose of the image capture device 320. The projection may be performed for a complete image or on a pixel-by-pixel basis. For example, pixel values for the synthetic image may be calculated by projecting the three-dimensional model 370 onto a camera plane, where the position and orientation of the camera plane is determined by a current pose of the image capture device 320 as represented by the state of the robotic device 360.

In one case, the three-dimensional model 370 may be deemed "dense" as pixel values within image data from the image capture device 320 are processed and contribute to the modelling of the three-dimensional space. For example, in a "dense" representation every pixel in the image may contribute as much information as possible to the tracking and mapping estimation procedure. This enables a three-dimensional model 370, i.e. a resulting representation of a map of a scene, to be projected back into a synthetic capture device or camera to reconstruct a "dense" image, i.e. an image at the resolution of the image capture device 320 where the vast majority of pixels in the synthesised image have data synthesised based on information stored with the model. This projection may be performed using the state of the robotic device 360, which represents at least the pose of the image capture device 320. In contrast, a "sparse" system, e.g. one that utilises key-points or extracted features, only uses a small subset of pixel values in the image data to generate a model. In the "sparse" case, a synthesised image cannot be created at a capture device resolution, as there is not enough information within the model. In this manner, a "dense" system acts to estimate one or more surfaces within a three-dimensional space with high accuracy, e.g. within a given tolerance of a real environment. A "dense" system may be considered as analogous to a quantized continuous system, whereas "sparse" systems operate on small sets of discrete points.

Figure 3B:
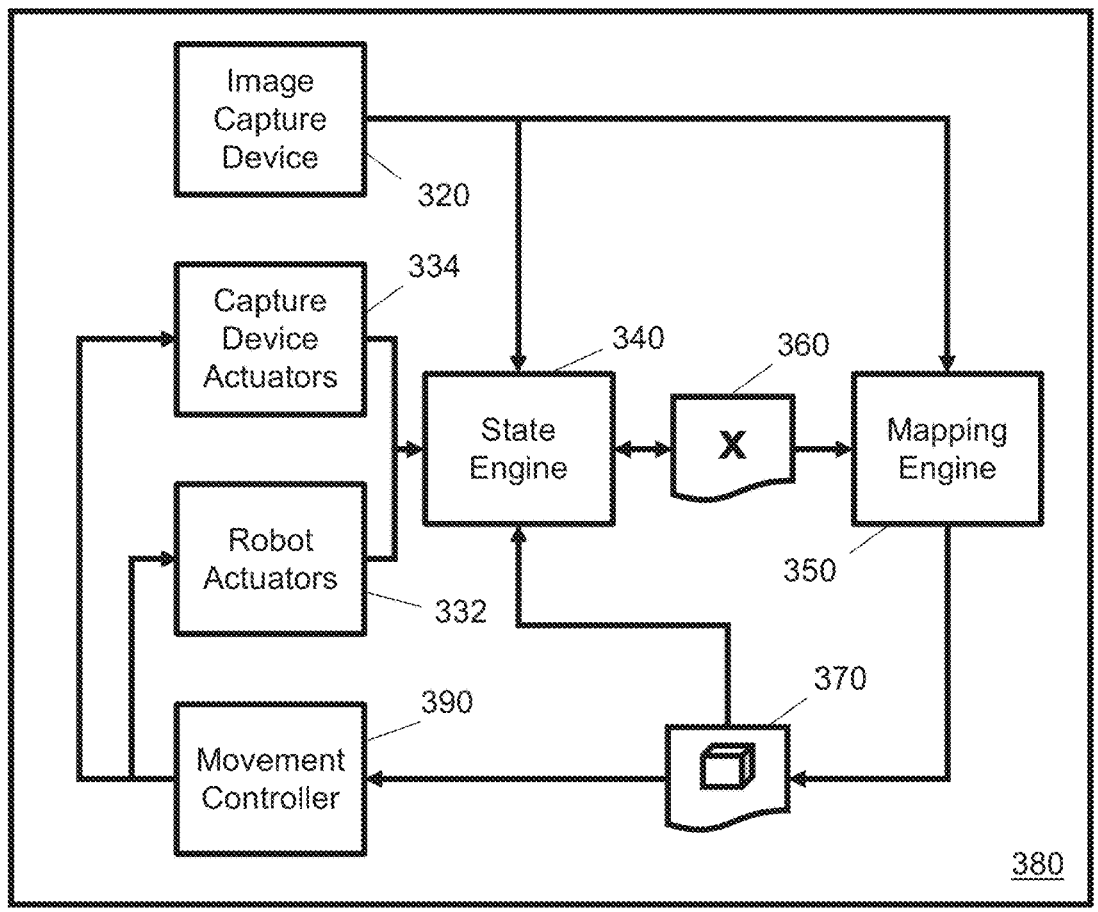
FIG. 3B is a schematic diagram of mapping system for a robotic device according to a second example.

FIG. 3B shows a robotic device 380 that is a variation of the example of FIG. 3A. In this variation, the one or more actuators 330 of FIG. 3A comprise two separate sets of actuators. A first set of robot actuators 332 is provided to move the robotic device 380 with respect to the environment. For example, these may comprise a set of wheels, legs, or rotors as illustrated in FIGS. 1C to 1H. A second set of capture device actuators 334 are then also provided to move the image capture device 320 with respect to the robotic device 380. For example, these may comprise a set of actuators for a moveable mount that couples the image capture device 320 to the robotic device 380. The capture device actuators 334 may comprise a series of motors that are used to move one or more joints of a moveable mount having a plurality of joints. In certain examples, the robot actuators 332 provide a plurality of degrees of freedom between the robotic device 380 and the environment and the capture device actuators 334 provide a plurality of degrees of freedom between the image capture device 320 and the robotic device 380.

The robotic device 380 of FIG. 3B also differs from the robotic device 310 of FIG. 3A in that it comprises a movement controller 390. The movement controller 390 may comprise an additional processing device as described above that is used to control the movement of the robotic device 380 within the environment. The movement controller 390 may allow for one or more of manual control and autonomous control. The movement controller 390 is communicatively coupled to the robot actuators 332 and the capture device actuators 334. The movement controller 390 is thus able to control movement of the robotic device 380 and the image capture device 320. When exploring a new environment, the robotic device 380 may implement exploration strategies that involve movement of the robotic device 380 and movement of the image capture device 320. For example, in a search and rescue situation, the movement controller 390 may control the robot actuators 332 to move the robotic device 380 to a new location. Once in the new location, the movement controller 390 may control the capture device actuators 334 when the robotic device 380 is stationary, to pan around the environment at the location.

In the example of FIG. 3B, the movement controller 390 is configured to use the three-dimensional model 370 to navigate the environment. For example, the three-dimensional model 370 may indicate physical boundaries and obstacles within the environment (e.g. such as objects 115 in FIG. 1A). In this case, the movement controller 390 may determine a movement path to avoid the physical boundaries and obstacles while moving the robotic device within the environment. In another case, a three-dimensional model 370 of a room or other interior location may indicate egress points to allow the robotic device 380 to exit the room. The movement controller 390 may also need to control the location of the image capture device 320 to avoid physical boundaries and obstacles, e.g. walls, objects or passageways of a low height.

In the example of FIG. 3B, the state engine 340 is further configured to use image data from the image capture device 320 and the three-dimensional model 370 to update the state of the robotic device 360. In one case, the state engine 340 is configured to update the state of the robotic device 360 in a manner that seeks to minimise a point-to-plane error between back-projected points of an image captured by the image capture device 320 and corresponding points in the three-dimensional model 370. In this case, the back-projection is based on a current pose of the image capture device 320 that is indicated by the state of the robotic device 360. The image data in this case may comprise depth data and the update of the state may seek to minimise a geometric error between the depth data and the three-dimensional model 370.

In certain cases, the mapping engine 350 may be configured to determine an iterative-closest-point error. In this case, the state engine 340 may be configured to additionally use the iterative-closest-point error to determine the state of the robotic device 360.

In certain cases, the image capture device 320 is configured to output colour image data and a depth map, e.g. as shown in FIGS. 2B and 2C. In this case, the mapping engine 350 is configured to use the colour image data and the depth map to update the three-dimensional model 370. This is described in more detail below with reference to the examples of FIGS. 5 and 7. In certain cases, the state engine 340 may only use the depth map. Although the state engine 340 and the mapping engine 350 are described as separate components in the examples of FIGS. 3A and 3B, it should be noted that in certain cases, their functionality may be combined into a single component, or certain functions may be moved from one component to the other without loss of functionality of the system as a whole.

In one case, the robotic devices 310, 380 of FIGS. 3A and 3B may be arranged to perform one or more functions. For example, a robotic device may be arranged to perform a mapping function, locate particular persons and/or objects (e.g. in an emergency), transport objects, perform cleaning or maintenance etc. To perform one or more functions the robotic device may comprise additional components, such as further sensory devices, vacuum systems and/or actuators to interact with the environment.

Figure 4A:
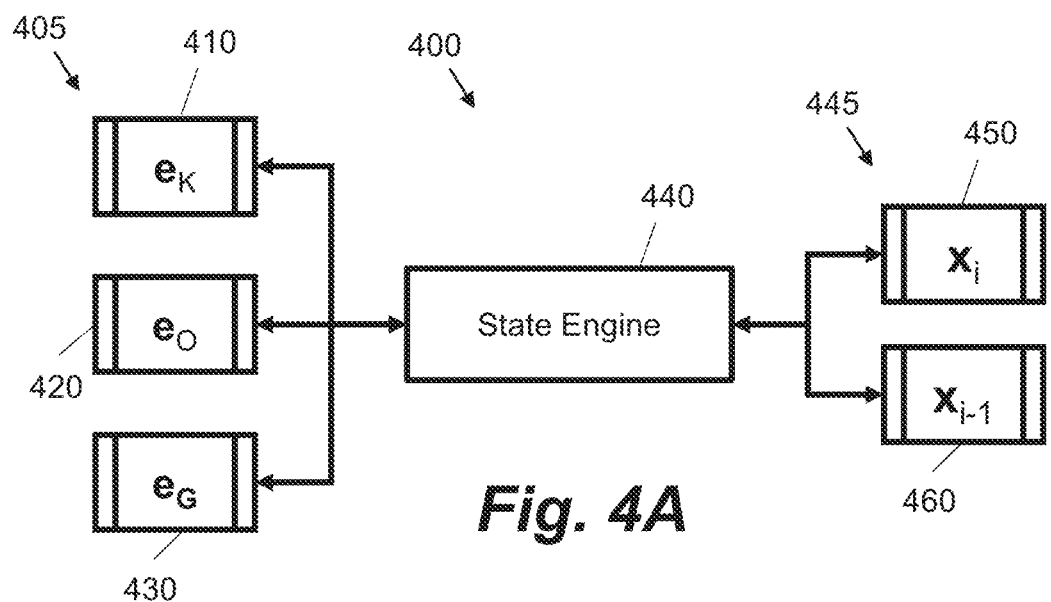
FIG. 4A is a schematic diagram of a state engine according to an example.

FIG. 4A shows an example mapping system 400 for a robotic device. The mapping system 400 may be used as part of the robotic device 310, 380 in FIGS. 3A and 3B, or as part of another example robotic device. The mapping system 400 is configured to operate with a robotic device comprising one or more actuators to move the robotic device within an environment, e.g. such as actuators 330 and 332 in FIGS. 3A and 3B, or actuators 135, 164, 184, and 194 of FIGS. 1A to 1H. The robotic device in this case also comprises a moveable mount for an image capture device. The moveable mount may comprise one of the mounts 165, 185, 195 shown in FIGS. 1C, 1E and 1G, a mount comprising the capture device actuators 334 of FIG. 3B, or another moveable mechanical coupling that extends between the robotic device and the image capture device. In the present example, the "moveable mount" may comprise one or more joints that are moveable by a set of corresponding motors. Hence, in certain cases the moveable mount is moveable with respect to the robotic device, e.g. it may be mounted upon the robotic device yet be independently moveable. When moved upon the robotic device, the moveable mount may effect movement within the environment. The moveable mount may have a wide variety of possible implementations including simple rotational elements and pivoting elements, as well as more complex multi-joint linkages.

The mapping system 400 operates on error data 405. The error data 405 in this example comprises a kinematic error 410, an odometric error 420 and a geometric error 430. The error data 405 is accessed by a state engine 440. The state engine 440 may comprise one of the state engines 340 from FIGS. 3A and 3B or another processing device. The state engine 440 is configured to update state data 445 for the robotic device. In this example, the state data 445 is partitioned into data representing a current state of the robotic device 450 and data representing a previous state of the robotic device 460. For ease of explanation, reference will be made to "the current state" and "the previous state", where this should be taken to refer to data held in a memory or a storage device that indicates at least one configuration of the robotic device. The state engine 440 is configured to jointly optimise the current state of the robotic device 450 and the previous state of the robotic device 460. This results in updated state data 445, including an updated current state of the robotic device 450, which may be used by the mapping system 400 to update a model of the environment. For example, the updated current state of the robotic device 450 may be used by a component similar to the mapping engine 350 of FIGS. 3A and 3B to update a three-dimensional model similar to model 370.

Figure 4B:
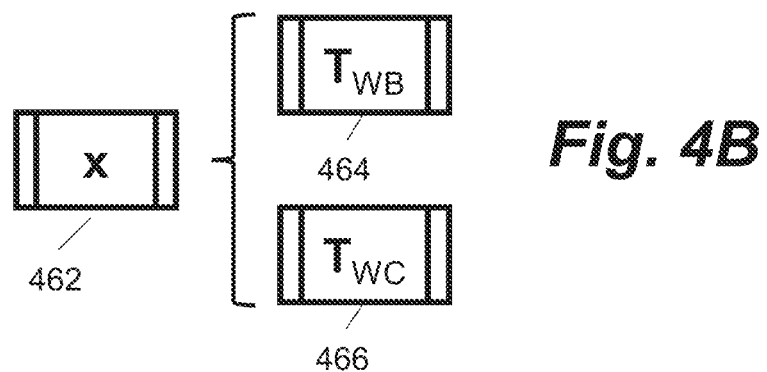
FIG. 4B is a schematic diagram showing components of a state of a robotic device according to an example.

In the present example, each of the current state of the robotic device 450 and the previous state of the robotic device 460 comprise two data components. This is shown in FIG. 4B, with reference to a general state of the robotic device 462. In FIG. 4B the general state of the robotic device 462 comprises data indicating a pose of the robotic device with respect to a model of the environment 464 and data indicating a pose of the image capture device with respect to the model 466. In FIG. 4B these poses are represented as the two transformations $T_{WB}$ and $T_{WC}$ that were described previously with reference to FIGS. 1A to 1H. The poses may be stored in a number of different ways, for example, a pose may be decomposed into translation and rotation aspects, which may be stored separately.

The kinematic error 410 comprises a function of a kinematic measurement associated with the moveable mount of the robotic device and a pose of the image capture device with respect to the robotic device derived from the current state of the robotic device 450. For example, the kinematic measurement may comprise one or more measurements obtained directly or indirectly from one or more actuators of the robotic device that control the moveable mount.

The odometric error 420 comprises a function of odometry measurements associated with the one or more actuators and an odometric difference between the current state and the previous state. The one or more actuators in this case may comprise actuators such as robot actuators 332 in FIG. 3B or actuators 164, 184 and 194 in FIGS. 1C, 1E and 1G, i.e. actuators that move the robotic device within the environment. The odometric measurement may comprise one or more measurements obtained directly or indirectly from these actuators. The odometric error 420 relates to movement of the robotic device within the environment, whereas the kinematic error 410 relates to movement of the image capture device as effected by the moveable mount.

The geometric error 430 comprises a comparison of image data from the image capture device and the model of the environment, where the comparison uses a projection based on the current state of the robotic device 450. For example, the image data may be back-projected onto the model or the model may be projected onto a plane for the image data. Back-projection may use a pose of the image capture device with respect to the model, e.g. $T_{WC}$, from the current state of the robotic device, and projection may use a computed inverse of the pose. Either approach may be applied. The geometric error 430 may be based on a comparison of depth data for a provided frame of image data and the model of the environment. The geometric error 430 may be computed for a plurality of pixels from the image data, e.g. a plurality of depth measurements from depth data such as depth data 250 or 280 in FIGS. 2B and 2C. The plurality of pixels may comprise a subset of the image data or all the pixels in the image data. In one case, the geometric error 430 may be computed based on a point-to-plane iterative closest point (ICP) function.

In one case, the state engine 440 optimises a cost function comprising the kinematic error 410, the odometric error 420 and the geometric error 430. For example, the state engine 440 may determine values for the previous and current states that minimise the cost function, wherein each of the errors 410, 420 and 430 are defined as functions that have variables associated with one or more of the current state and the previous state. For example, the state engine 440 may determine at least values for transformations $T_{WB}$ and $T_{WC}$ for the current state and for the transformation $T_{WB}$ for the previous state that minimise the cost function. In this manner, the pose of the image capture device with respect to the model and the pose of the robotic device with respect to the model may be determined as constrained by geometric tracking and kinematic and odometry data associated with the robotic device. The kinematic error 410 may constrain the values of the two transformations $T_{WB}$ and $T_{WC}$ as represented within the current state of the robotic device 450. The odometric error 420 may constrain the value of the transformation $T_{WB}$ within the current state of the robotic device 450 and the previous state of the robotic device 460. The geometric error 430 may constrain the value of the transformation $T_{WC}$ within the current state of the robotic device 450.

The kinematic measurement used to determine the kinematic error 410 may be obtained from mount actuators such as the capture device actuators 334 shown in FIG. 3B, i.e. actuators that are used to move the moveable mount. The kinematic measurement may be received directly from the mount actuators, e.g. as a data packet or signal communicated over a systems bus of the robotic device, and/or may be received indirectly, e.g. the state engine 440 may access a memory or register of the robotic device to retrieve the kinematic measurement. In one case the kinematic measurement may be measured via an observation of the moveable mount, e.g. determined from image data featuring the robotic device. In another case, the kinematic measurements may be obtained from a controller of the actuators, such as the movement controller 390 in FIG. 3, that is arranged to receive feedback from actuators.

The kinematic measurement may comprise a measurement of a transformation of an image capture device pose with respect to the robotic device, e.g. $\tilde{T}_{BC}$. If the moveable mount comprises a plurality of joints, where each joint is moved using one or more motors, the kinematic measurement may be determined using forward kinematics. Forward kinematics refers to the use of kinematic equations associated with the robotic device that enable a position of an end-effector, e.g. a point at the end of the moveable mount, to be determined based on specified values for the joint parameters. In this case, the specified values may be derived from measurements of motor position that are associated with the joints. In this case, the moveable mount may be defined as a serial chain of links, where two links are joined with a joint. A first rigid transformation may be defined for each joint to characterise the relative movement that is possible at the joint and a second rigid transformation may define the dimensions of each joint. The transformations will depend on the form of the moveable mount and/or the robotic device. A sequence of first and second rigid transformations may be defined that models the movement of the moveable mount from a base on the robotic device to an end-effector, where the image capture device is mounted at the end-effector. The state engine 440 may receive "raw" joint measurements and compute a pose of the image capture device with respect to the robotic device $\tilde{T}_{BC}$ by evaluating the sequence of rigid transformations, or may receive the pose from an external component, e.g. a microcontroller associated with the moveable mount located within one of the moveable mount and the robotic device.

In certain cases, that state engine 440 initialises a state of the robotic device using the kinematic measurement and the odometric measurement. A first set of values for the previous state of the robotic device 460 may be a set of 0 values or a predefined starting configuration (e.g. a known starting position and orientation). A first set of values for the current state of the robotic device 450 may then be determined based on the initialised previous state and an initial kinematic measurement and an initial odometric measurement (e.g. as measured between a starting position and receipt of a frame of video data). For example, a robotic device may be initialised with an arbitrary body pose and an image capture device pose determined based on forward kinematic determinations.

In one case, the kinematic error 410 comprises a difference between a measured translation indicating a position of the image capture device with respect to the robotic device and a translation based on the current state of the robotic device 450. The kinematic error 410 may also comprise a difference between a measured orientation of the image capture device with respect to the robotic device and a translation based on the current state of the robotic device 450. The pose of the image capture device with respect to the robotic device may be computed as $T_{BC} = T_{WB}^{-1} T_{WC}$. In one case, the kinematic error 410 is determined as:

$$e_K = \begin{bmatrix} {}_B\tilde{r}_{BC} - {}_B r_{BC} \\ 2[\tilde{q}_{BC} \otimes q_{BC}^{-1}]_{1:3} \end{bmatrix}$$

where ${}_B\tilde{r}_{BC}$ is a measured translation of the image capture device with respect to the robotic device, ${}_B r_{BC}$ is a translation of the image capture device with respect to the robotic device as represented in the state of the robotic device, $\tilde{q}_{BC}$ is a measured orientation of the image capture device with respect to the robotic device and $q_{BC}$ is an orientation of the image capture device with respect to the robotic device as represented in the state of the robotic device. Optimising the state of the robotic device may comprise determining the values of ${}_B r_{BC}$ and $q_{BC}$ using the provided values of ${}_B\tilde{r}_{BC}$ and $\tilde{q}_{BC}$.

In one case, the odometric error 420 may be determined in a similar manner to the kinematic error. The odometric error 420 may be an error that involves both the current state and the previous state of the robotic device. For example, the odometric error may consider an error between a measured change in the pose of the robotic device between the times of the two states and a change in the pose of the robotic device between the current state and the previous state. For example, a change in pose may be represented by the transformation $T_{B0B1} = T_{WB0}^{-1} T_{WB1}$, where 0 indicates the previous state and 1 indicates the current state. Following the above example, in one case the odometric error 420 is determined as:

$$e_o = \begin{bmatrix} {}_{B0}\tilde{r}_{B0B1} - {}_{B0} r_{B0B1} \\ 2[\tilde{q}_{B0B1} \otimes q_{B0B1}^{-1}]_{1:3} \end{bmatrix}$$

where ${}_{B0}\tilde{r}_{B0B1}$ is a measured change in position of the robotic device, ${}_{B0} r_{B0B1}$ is a change in position of the robotic device as represented by the current and previous states of the robotic device, $\tilde{q}_{B0B1}$ is a measured change in orientation of robotic device and $q_{B0B1}$ is change in orientation of the robotic device as represented by the current and previous states of the robotic device. Optimising the state of the robotic device may comprise determining the values of ${}_{B0} r_{B0B1}$ and $q_{B0B1}$ using the provided values of ${}_{B0}\tilde{r}_{B0B1}$ and $\tilde{q}_{B0B1}$.

In one case, the geometric error 430 is determined for a kth pixel of a depth map as:

$$e_G = {}_W n_k ({}_W v_k - T_{WC} {}_C v_k)$$

where the bracketed portion represents a difference between a back-projected point ${}_c v_k$ obtained from the image data (the projection using the pose of the image capture device with respect to the model $T_{WC}$ from the current state of the robotic device 450) and a corresponding point in the model $_W v_k$, this difference being project along the surface normal $_W n_k$ for the point as indicated in the model.

In one case, information matrices are constructed for each of the error terms to model measurement uncertainty. For example, an information matrix for the kinematic error 410 and/or the odometric error 420 may be determined as:

$$W_{K/O} = \begin{bmatrix} \sigma_r^{-2} I_3 & 0_3 \\ 0_3 & \sigma_\alpha^{-2} I_3 \end{bmatrix}$$

where $\sigma_r$ is variance for a translation measurement and $\sigma_\alpha$ is a variance for an orientation measurement. An information matrix for the geometric error 430 may be an inverse covariance matrix associated with a depth measurement.

The state engine 440 may operate iteratively to maintain the current state of the robotic device 450 over time. For example, the state engine 440 may be activated following the arrival of a new frame of video data from the image capture device. The state engine 440 may be seen to operate to refine a prediction of the current state of the robotic device 450 that is made based on kinematic and odometric measurements.

In one case, the state engine 440 is configured to determine a change in the state of the robotic device that is modelled as a local perturbation to the state, $\delta x$. This local perturbation may be split into a translation component and an orientation component. In this case, the state engine 440 may optimise the cost function discussed above by determining a minimal local perturbation that minimises the cost function. Optimisation may be performed using any known optimisation procedure. In one case, a Jacobian matrix and set of residuals are computed for each term in the cost function. The Jacobian matrices and residuals of each term may be combined into a Jacobian matrix J and set of residuals b for the cost function. In one case, optimisation may be performed by computing a least-square solution such as:

$$\operatorname*{argmin}_{\delta x} \|J \partial x + b\|_2^2$$

In one case, a local perturbation to each of the previous state of the robotic device 460 and the current state of the robotic device 450 is computed. For example, a state update during an iteration of the state engine 440 may comprise determining $[\partial x_0^T, \partial x_1^T]$, where 0 represents the previous state and 1 represents the current state. The optimisation may consist of a 24×24 system of normal equations. This may be solved using one or more processors. In one case, this may be solved using a Gauss-Newton Iterative method with a three-level coarse-to-fine pyramid. In certain cases, the one or more processors may form part of one or more graphical processing units. These graphical processing units may be provided on one or more embedded processors of the robotic device.

In certain cases, the state engine 440 of FIG. 4A is configured to jointly optimise the current state and the previous state using a linear prior. For example, a cost function that is optimised by the state engine 440 to determine a state update comprises an additional term that represents the linear prior. The linear prior may be determined by marginalising the kinematic error, the odometric error and the geometric error, and/or the previous state ready for a subsequent iteration. The state engine 440 may be configured to compute a Jacobian matrix H* and a set of residuals b* that are used in the state optimisation as described above. In one case, the Schur-Complement may be used such that:

$$H^* = J_1^T J_1 - J_1^T J_0 (J_0^T J_0)^{-1} J_0^T J_1$$

$$b^* = J_1^T b_1 - J_1^T J_0 (J_0^T J_0)^{-1} J_0^T b_0$$

where $J_i$ is the Jacobian matrix for the cost function for state i (e.g. where 0 is the previous state and 1 is the current state) and $b_i$ is the set of residuals for the cost function for state i (e.g. where 0 is the previous state and 1 is the current state). The Jacobian matrix H* and a set of residuals b* may be used as the linear prior for the next optimisation iteration, e.g. when a new frame of video data is received. In certain cases, a first order correction may be performed for the set of residuals for subsequent updates, e.g.: $b^{*'} = b^* + H^* \Delta x$ where $\Delta x$ is the difference between subsequent and previous linearization points. A linear prior may be represented in the cost function as an error term with a form:

$$e_{prior} = \begin{bmatrix} w\hat{r}_{WB} - w r_{WB} \\ 2[\hat{q}_{WB} \otimes q_{WB}^{-1}]_{1:3} \\ w\hat{r}_{WC} - w r_{WC} \\ 2[\hat{q}_{WC} \otimes q_{WC}^{-1}]_{1:3} \end{bmatrix}$$

i.e. with terms indicating translation and orientation differences for the robotic device ("B") and the image capture device ("C") with respect to the model ("W"). This error term may be used within the optimisation, and/or for one or more of initialisation of the robotic device and loop closure corrections. During optimisation, the error term and the previous Jacobian matrix and set of residuals may be used. A new Jacobian matrix and set of residuals may be obtained at the end of each optimisation procedure, and these may be used for optimisation for a subsequent frame.

In certain cases, a capture device intrinsic transform with respect to an end-effector of the moveable mount may be calibrated using visual tags or the like. For example, the camera intrinsic transform may be determined by minimising a re-projection error of detected corner points by jointly optimising image capture device extrinsics and the relative poses of the visual tags with respect to the model. The capture device intrinsic transform may be determined during a calibration stage and deemed to be constant for the operation of the robotic device.

In the example of FIG. 4A, the state engine 440 may be configured to determine at least an updated set of values for the current state of the robotic device 450. The mapping system 400 is then configured to update the model of the environment using the updated current state of the robotic device 450. For example, the pose of the image capture device with respect to the model, as represented by the transformation $T_{WC}$ may be used to fuse image data from the image capture device with the model of the environment. The process of updating a model is explained in more detail with reference below to the examples of FIGS. 5, 7 and 8. In one case, the state engine 440 may be used as a tracking module for a mapping engine such as mapping engine 350 shown in FIGS. 3A and 3B.

In certain cases, the mapping system 400 is configured to use a deformation graph to align a first set of portions of the model with a second set of portions of the model. This is described in more detail below with reference to FIGS. 7 and 8. The deformation graph indicates a set of neighbours for a given position in the model that are to be used to modify the model at the given position during alignment. This alignment may be performed to enact a "loop-closure" with respect to the model. The mapping system 400 may be configured to detect and perform a "loop-closure" as described in more detail below. In the case of a "loop-closure" the mapping system 400 may compute a new pose for the image capture device (e.g. $T_{WC'}$). In this case, the state engine 440 may receive the new pose from a mapping engine such as mapping engine 350 in FIGS. 3A and 3B. This new pose may be used to reset a previous state of the robotic device 460, e.g. when determining the current state for a next frame of video data. The pose for the image capture device in the previous state may be replaced based on the new pose received from the mapping engine and the pose of the robotic device may be updated using the updated pose for the image capture device, e.g. $T_{WB'} = T_{WC'} T_{BC}^{-1}$, where $T_{BC}$ is a computed pose of the image capture device with respect to the robotic device (e.g. as computed using the state of the robotic device before the new pose is received). If a linear prior is used, it may be initialised in a similar manner to an initial start-up of the state engine 440. An initial body pose and/or an initial camera pose may be measured to initialise the linear prior.

FIG. 5 shows an example 500 of a mapping engine 510 that may be used to build a model of an environment. The mapping engine 510 is presented as an example to better explain how a current state of a robotic device may be used to update a model of an environment, however it should be noted that different implementations of a mapping engine may also use this state in a similar way. The mapping engine 510 is configured to obtain image data 520. This may be image data that is actively, or has been previously, been generated by an image capture device, such as image capture devices 120, 210 and 320 in the previous Figures. The image data 520 is associated with an observation of the environment using the capture device, e.g. a view of a three-dimensional space over time. For example, the image data 520 may comprise video data over a given time period, wherein over the given time period the robotic device moves within the environment. The mapping engine 510 is configured to process the image data 520 and to compute a model 530 of the environment. In this example, this model is a three-dimensional model of a three-dimensional space.

The mapping engine 510 of the present example comprises at least a model segmenter 540 and a registration engine 550. The model segmenter 540 is configured to segment the three-dimensional model 530 into at least active and inactive portions based on at least one model property. The registration engine 550 is configured to align active portions of the three-dimensional model 530 with inactive portions of the three-dimensional model 530 over time. The mapping engine 510 is further configured to use active portions of the three-dimensional model 530 to update said model over time, i.e. the inactive portions are not used to update the model.

In certain cases, the mapping engine 510 is configured to operate on a frame-by-frame basis. In one implementation, the mapping engine 510 may be arranged to load successive frames $F_t$ of image data into memory. These frames may be stored in data storage internal to a robotic device or obtained from external data storage. In other implementations, the mapping engine 510 may retrieve one or more frames of image data from memory internal to the robotic device. In one implementation, a portion of internal memory may hold frame data at a particular time t and may be overwritten as new image data 520 is received from a capture device.

When the mapping engine 510 is configured to operate on a frame-by-frame basis, the mapping engine 510 may be configured to update the three-dimensional model 530 on a frame-by-frame basis. This may comprise "fusing" a particular frame of image data 520 with the three-dimensional model 530, i.e. using the frame of image data 520 to modify and update the three-dimensional model 530. This may comprise including new positional elements that may be derived from the frame of image data 520. Certain specific examples of how the three-dimensional model 530 may be generated or updated are discussed in more detail below. It should be noted that the approaches discussed herein may be applied to frames of image data that are incomplete and/or noisy. Updating the three-dimensional model 530 may be performed using one or more of the photometric and depth data components of the image data. In one case, only depth data may be captured and used to update the three-dimensional model 530.

In one case, the mapping engine 510 is configured to use a pose of a capture device as represented within a current state of the robotic device, e.g. state 360 in FIGS. 3A and 3B or state 450, 462 in FIGS. 4A and 4B. Where two or more capture devices are used, the state of the robotic device may comprise data representing the pose of each capture device.

The model segmenter 540 may be configured to segment the three-dimensional model 530 by modifying model data. For example, in one case a given positional element of the three-dimensional model 530 may have a variable indicating whether it forms part of the active portions or the inactive portions of the model. In another case, the model segmenter 540 may be configured to segment the three-dimensional model 530 as a function applied to said model. For example, the three-dimensional model 530 may be input to the model segmenter 540 and the model segmenter 540 may be configured to output one or more of active portions and inactive portions of the three-dimensional model 530. Either approach may be used.

A model property used by the model segmenter 540 to segment the three-dimensional model 530 may be indicative of a level of certainty in the three-dimensional model 530. For example, the model segmenter 540 may segment the three-dimensional model 530 based on one or more of time and distance. In the first case, the model property may comprise one of a time of model generation and a time of model update for a given position in the three-dimensional model. In this case the inactive portions may be indicative of a past observation time that differs from a current observation time by more than a predefined amount. For example, the model segmenter 540 may be arranged to process time data for each positional element making up the three-dimensional model 530 to divide the set of positional elements for the three-dimensional model 530 into two disjoint sets θ, representing active elements, and Ψ, representing inactive elements. To do this the model segmenter 540 may process a timestamp $t_P$ for each positional element (e.g. a time of the positional element was last modified) such that, for a given time of segmentation t (e.g. relating to a particular processed frame of image data $F_t$), each positional element in the model $P_c$ (where c is a co-ordinate in three-dimensional space), a positional element is in the set θ (i.e. $P_c \in \theta$) if $t - t_P < \delta_t$, and a positional element is in the set Ψ (i.e. $P_c \in \Psi$) if $t - t_P \leq \delta_t$, where $\delta_t$ is a defined period of time. This form of segmentation or model element classification gradually labels positional elements that have not been seen in a period of time $\delta_t$ as inactive. It may be considered an application of a time window. As described above, the mapping engine 510 may be configured to fuse new frames of image data into the active portions of the three-dimensional model 530, wherein the inactive portions of the model are not used for tracking and/or data fusion. In this case, following alignment of active and inactive portions by the registration engine 550, the inactive portions that are aligned may be modified such that they now become active portions. For example, on alignment of inactive portions, the registration engine 550 may update a time of last modification associated with each positional element in the inactive portions. This may have an effect that this aligned inactive portions now become active following processing of the three-dimensional model 530 by the model segmenter 540. This enables continuous frame-to-model tracking and also model-to-model tracking, and allows for viewpoint-invariant loop closures.

In one case, the mapping engine 510 is configured to compute an active model frame based on a projection from the active portions of the three-dimensional model 530 for use in updating the model. For example, such a projection may provide a two-dimensional viewpoint or virtual frame representing a predicted view or observation of the active portions of the three-dimensional model 530. In one case, the active model frame may be generated based on the pose of the image capture device with respect to the model as obtained from the current state of the robotic device at a given time (e.g. for a given frame of video data). In one case, predicted frames may be calculated for each data set making up the image data 520. For example, when processing image data similar to that shown in FIGS. 2B and 2C, each active model frame may comprise a predicted frame of depth data, $\hat{D}_t^\alpha$, and, in certain cases, a predicted frame of photometric data, $\hat{C}_t^\alpha$. These may be of the same resolution as a recorded or captured image frame $F_t$ from the image data 520. Use of an active model frame is described in more detail with reference to FIG. 5 below.

As described above, the mapping engine 510 may be arranged to generate the three-dimensional model 530 over time, e.g. as a plurality of frames of recorded image data 520 are processed. In one case, the image data 520 is representative of an observation of the three-dimensional space over time as the image capture device moves, e.g. by way of one or more of movement of the robotic device and movement of the moveable mount upon the robotic device; as such, as frames of image data 520 are processed by the mapping engine 510, the three-dimensional model 530 grows in size, e.g. incorporates more positional elements representing different portions of the three-dimensional space. Moreover, the registration engine 550 is configured to perform alignment of active and inactive portions of the model over time; this may occur as portions of the three-dimensional space are revisited or re-observed, i.e. as "loops" in the motion of the capture device are closed. This means that the accuracy and consistency of the three-dimensional model 530 also increases as more frames of image data 520 are processed.

An output of the mapping engine 510 may be considered to comprise the three-dimensional model 530 of the observed three-dimensional space. This model 530 may comprise at least positional elements defined with reference to three-dimensions. Each positional element may further be associated with data that indicates the presence of solid surfaces within the three-dimensional space. For example, in a voxel-based model a surface may be represented as a zero value or crossing point for a variable representing free-space; in a surface element model, positional elements may be defined for surfaces within the three-dimensional space, as such each positional element may indicate a particular surface within the model.

FIG. 6A shows a schematic representation of a data structure 610 that may be used to store positional elements of a model of an environment, e.g. as updated in examples described herein. The data structure 610 is shown for example only and should not be seen as limiting; other approaches and formats for storing data may be used depending on the implementation. In this example, the model comprises a three-dimensional surface element model. A surface element model comprises data definitions for a plurality of surface elements or "surfels", wherein each surface element represents a two-dimensional area (i.e. a surface) in three-dimensional space. This is shown in FIG. 6A as the data opens with a definition of a list of surface elements, e.g. "{surfels: . . . }. This list may be an unordered list. In this case, each surface element in the surface element model comprises at least data defining a position of the surface element in three-dimensions (i.e. a positional element or component) and data defining a normal vector for the surface element in three-dimensions (i.e. a "facing" direction for a surface associated with the element). This is shown schematically in FIG. 6B. One description of "surfels" may be found in the paper "Surfels: Surface elements as rendering primitives" by Pfister, Hanspeter, et al. as published in proceedings of the 27th annual conference on computer graphics and interactive techniques, ACM Press/Addison-Wesley Publishing Co., in July 2000.

FIG. 6B shows a schematic representation of a surface element or "surfel" 620. The surfel 620 comprises a surface, s, in three-dimensions. The surfel has a position, p, in three dimensions. In FIG. 6A this position is defined using a three-dimensional co-ordinate, e.g. the data "Position: $p_x$, $p_y$, $p_z$;" defining x, y and z co-ordinates. In other examples other co-ordinate systems may be used. In FIG. 6B the surfel also has a normal vector, n, that is defined within three-dimensions. In FIG. 6A this position is defined using a three-dimensional vector, e.g. the data "Normal: $n_x$, $n_y$, $n_z$;". Direction may be indicated using signed values within the vector definition. The example 610 in FIG. 6A also has further data that may be used, in certain examples, to describe the surface element. In the present case, the surface of the surfel is a circle or disc in three-dimensional space. As such, the surface in FIGS. 6A and 6B is defined by a radius, r, as set out as data "Radius: r;". The radius of each surfel is intended to represent the local surface area around a given point while minimising visible holes. In other examples, different data may be used to define the surface, e.g. using different geometric definitions and/or variables indicating the extent of the surface within three-dimensions. FIG. 6A shows that, in the present example, the surfel definition also comprises data defining: a colour of the surface ("Colour: R, G, B;"—in this case an RGB colour space is used but any known colour space is possible); a weight for the surfel ("Weight: w;"—this may be a real number that is used when fusing new measurements with the surfel); an initialisation time ("Init_Time: t0;") indicative of a time the surfel was first generated; and a last modified time ("Last_Modified: t;) indicative of a time when the surfel was last updated or modified. A surfel within this model representation may be declared as inactive when the time since that surfel was last updated or modified (e.g. had a raw image data value associated with it for data fusion) is greater than $\delta_t$. It should be appreciated that data defining attributes of a surfel may be added, modified or omitted depending on the implementation. As shown in FIG. 6A, multiple surfels may be defined in the list (e.g. between "{ ... }" in the example).

Figure 7:
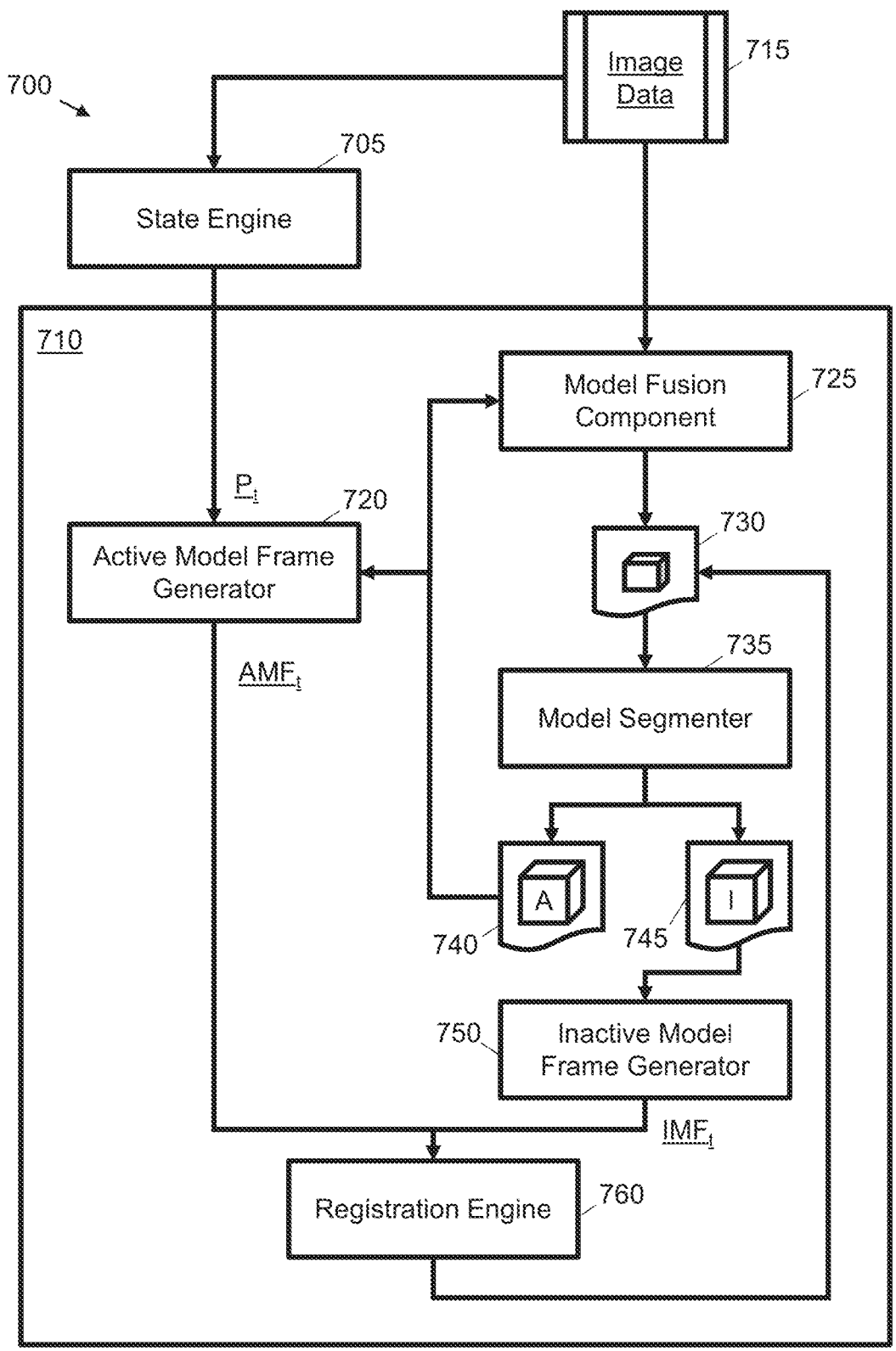
FIG. 7 is a schematic diagram showing the processing of image data by a mapping system according to an example.

FIG. 7 shows a mapping system 700 according to an example. The mapping system may comprise an implementation of the mapping system 400 of FIG. 4A. The mapping system 700 of FIG. 7 comprises a state engine 705 and a mapping engine 710. The state engine 705 may comprise the state engine 340 of FIGS. 3A and 3B, and/or the state engine 440 of FIG. 4A. The mapping engine 710 may comprise the mapping engine 350 of FIGS. 3A and 3B and/or the mapping engine 510 of FIG. 5. The example 700 of FIG. 7 shows schematically how certain components of the mapping engine 710 may interact with the state engine 705 to update a three-dimensional model following receipt of a frame of image data.

The state engine 705 and the mapping engine 710 of FIG. 7 access image data 715. The image data 715 is provided by an image capture device, such as image capture device 120 in FIGS. 1A to 1H or image capture device 320 in FIGS. 3A and 3B. The image data 715 may comprise image data 220 as shown in FIGS. 2A to 2C. The image data 715 is accessed by the state engine 705 and a model fusion component 725 of the mapping engine 710. The image data 715 may comprise frames of image data. In one case, the state engine 705 may receive depth data at time t from the image data to determine a geometric error as described with reference to FIG. 4A. The model fusion component may receive, at time t, depth data, $D_t^c$, and photometric data, $C_t^c$. In a simple case, these may comprise data stored in two two-dimensional arrays in memory at a time t, e.g. 640×480×1 depth values and 640×480×3 colour values. This data may be retrieved from a time-indexed data structure representing captured or previously-recorded image data and/or may be supplied as part of a live video feed, in each case the data relates to a live frame currently provided by at least one capture device. The model fusion component 725 is configured to update a three-dimensional model 730 based on a frame from image data 715.

In the example of FIG. 7, the state engine 705 is configured to determine a pose $P_t$ of at least one image capture device that provides the image data 715 at time t. This pose is determined using a current state of a robotic device comprising the image capture device. The pose, for example, may comprise values for the transformation $T_{WC}$ following a state optimisation procedure as described with reference to FIGS. 4A and 4B. The state engine 705 is communicatively coupled to an active model frame generator 720 of the mapping engine 710. The active model frame generator 720 is configured to compute an active model frame—$AMF_t$.

FIG. 7 also shows a model segmenter 735. This may comprise an implementation of the model segmenter 540 as described with reference to FIG. 5. The model segmenter 735 is arranged to split the three-dimensional model 730 into two portions or sets: a first portion or set is referred to herein as "active" portions 740; and a second portion or set is referred to herein as "inactive" portions 745. This may comprise applying a time window to the three-dimensional model 730. As may be seen from FIG. 7, the active portions 740 are used by the active model frame generator 720 and the model fusion component 725. The inactive portions 745 are not used by the active model frame generator 720 and the model fusion component 725.

In particular, the active model frame generator 720 is arranged to access the active portions 740 to generate an active model frame. This may be performed based on a projection from the active portions 740 of the three-dimensional model. The active model frame generator 720 is configured to use pose estimate at time t, $P_t$, to determine an active model frame at time t, $AMF_t$. This may comprise using the variable values of the pose estimate to determine a projection geometry using positional elements that comprise active portions 740 of the three-dimensional model.

As well as active model frame generator 720, the mapping engine 710 of FIG. 7 further comprises an inactive model frame generator 750. The inactive model frame generator 750 is similar to the active model frame generator 720 but is configured to generate an inactive model frame, $IMF_t$, from the inactive portions 745 of the three-dimensional model. For example, an inactive model frame may be computed by the inactive model frame generator 750 based on a geometric projection from the inactive portions 745. In one case, the active model frame generator 720 and the inactive model frame generator 750 may be implemented by a common frame generator that is configured to receive active and inactive portions of the model as differentiated inputs in order to respectively generate active and inactive model frames. As described with reference to the active model frames, each inactive model frame may comprise a predicted frame of depth data, $\hat{D}_t^i$, and a predicted frame of photometric data, $\hat{C}_t^i$.

In FIG. 7 the registration engine 760 is arranged to receive an active model frame, $AMF_t$, from the active model frame generator 720 and an inactive model frame, $IMF_t$, from the inactive model frame generator 750. In the present example, the registration engine 760 is configured to compare these two frames to determine a transformation that aligns the active model frame with the inactive model frame. As shown by the arrow in FIG. 7, this transformation may then be used to update the three-dimensional model 730 to bring the active and inactive portions of the model into alignment. This transformation may be used to apply a non-rigid spatial deformation of positional elements for both the active and inactive portions. In one case, the deformation may be applied using a deformation graph. This is described in more detail with reference to FIG. 8. The deformation or alignment may make use of the current pose estimate $P_t$. In certain cases, the registration of active and inactive model frames may use the current state of the robotic device as determined by the state engine 705. In one case, rather than attempting to align a previous predicted frame with a frame of newly-received image data, the registration engine 760 is configured to determine a transformation, $H_t$, that aligns the active and inactive frames. If alignment is performed, the registration engine 760 may set all visible inactive positional elements, e.g. those visible in the inactive model frame, to be active.

The alignment or deformation performed by the registration engine 760 may enact a "loop" closure, i.e. align positional elements of the model generated from newly received image data with positional elements that correspond to the same region of the three-dimensional space that were previously generated and/or modified based on previously received image data. For example, without the registration engine 760, when a capture device completes a motion loop, e.g. returns to view a region of the space that was previously observed, previous portions of the model may be out of alignment with newer portions of the model. This misalignment or "drift" in the model occurs as the generation of the model uses estimates and seeks to minimise error functions, e.g. operates non-deterministically, such that small errors in the pose estimate and the model may accrue as the model is generated. The registration engine 760 in FIG. 7 attempts to continuously, e.g. for each frame, register active portions of the model within a current estimated capture device (i.e. active model) frame with the inactive portions of the model within the same frame. If registration is successful, e.g. based on an alignment metric or level of deformation that is required, a motion loop of the capture device has been closed, and the newer active portions have been aligned to the older inactive portions, wherein the entire three-dimensional model 730 may be non-rigidly deformed into place to reflect this registration. In certain cases, the registration engine 760 is configured to reactivate the inactive portions of the model that were used to perform the registration, e.g. those that were used in the generation of the inactive model frame. This enables model fusion by the model fusion component 725 to take place between the registered areas of the model. As described above, fusing data is performed in areas of the three-dimensional model 730 that have been most recently observed (i.e. the active portions 740 or areas of the model), while older parts of the model that have not been observed in a period of time may be segmented by the model segmenter 735 into inactive portions 745 or areas of the model that are not used for tracking or data fusion.

Figure 8:
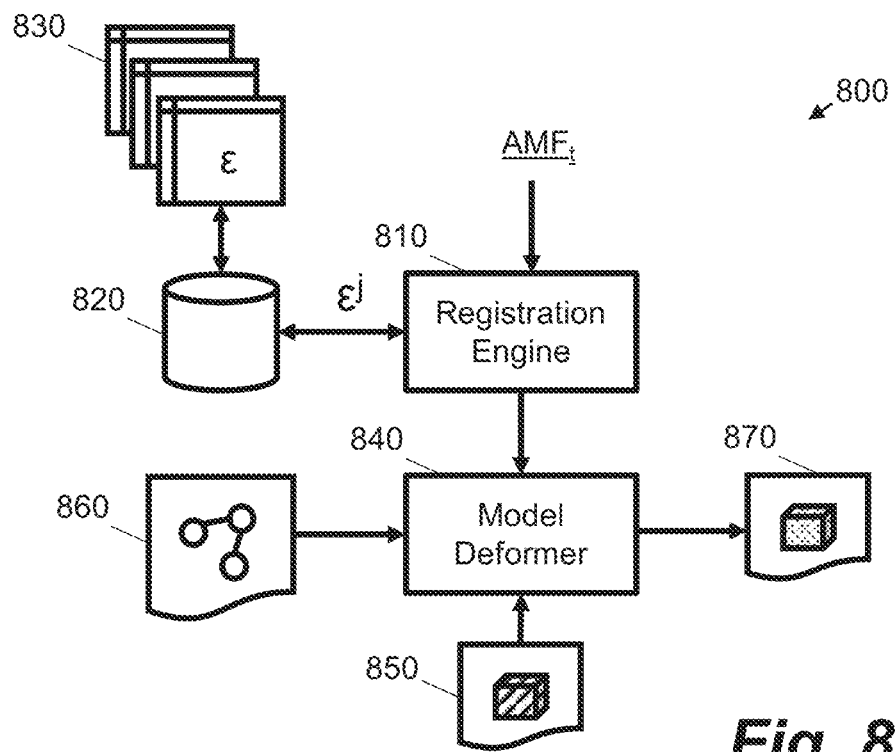
FIG. 8 is a schematic diagram showing an example that uses stored representations and a deformation graph.

FIG. 8 shows an example 800 of additional features of the registration engine 810 that may be used in certain implementations. In FIG. 8, the registration engine 810, which may have the same functionality as any of the previously described registration engines 550 or 760, is communicatively coupled to a data storage device 820. The data storage device 820 stores representations 830 ("ε") of the three-dimensional model over time. These representations 830 may comprise representations of active model frames, $AMF_t$, as they are generated by a model engine; e.g. may comprise a representation of depth data, $\hat{D}_t^\alpha$, and of photometric data, $\hat{C}_t^\alpha$. In one case the representation may be a compressed and/or down-sampled representation of an active model frame. Parts of predicted views in an active model frame that are devoid of any mapped surface may be filled, in certain cases, using a current frame from the image data. In certain cases, the representation may comprise a fern-encoding of an active model frame. Each representation may comprise data associated with one or more of: a fern encoding string; a downsampled predicted frame of depth data; a downsampled predicted frame of photometric data; a current pose estimate; and an initialisation time for the representation. A downsampled frame size, e.g. 80×60 may be used.

In the example of FIG. 8, an active model frame, $AMF_t$, is received by the registration engine 810. An attempt is then made to match the active model frame, $AMF_t$, with one of the representations 830 in the data storage device 820. For example, a new representation may be generated from the received active model frame $AMF_t$ and compared with the representations 830 stored in the data storage device 820, e.g. the match may be performed using the fern encoded representations. A match may be indicated by an output of a comparison function, e.g. an error or match imaging metric may indicate a degree of similarity between compared frames or representations. For example, a comparison may be made between fern-encodings. In this case the fern-encoding may comprise a binary code, wherein two images may be compared by summing a "distance" between two binary codes. A smallest distance is deemed to be the "best" match, wherein the distance may be compared to a threshold to determine whether the match is "good". The active model frame, $AMF_t$, may be downsampled to perform the matching, e.g. a fern-encoding may be made on a downsampled frame. In this case, a metric value indicating a best match (e.g. a lowest value of an imaging metric indicating a difference or error) may be used to indicate a matching stored representation $ε^j$. The stored representation, as well as having data that is used for the matching (e.g. a fern-encoding) may also comprise a representation of a model frame, e.g. $ε_D^j$, and $ε_C^j$. In one case, a imaging metric value for a best match may further be compared with a predefined threshold to determine if the match is valid. For example, even a "best" match may be a poor actual match, e.g. have a high match error; the threshold comparison thus avoids the use of these poor matches. Downsampling may be used by the registration engine 810 as if a relatively "coarse" match is found and is correct, then subsequent active and inactive model frames will be close enough to enable alignment as performed in FIG. 8, e.g. they will align enough following a "global" loop closure such that a more precise "local" loop closure is possible.

In one case, if no match is found, e.g. if a matching imaging metric is above a given error threshold, then registration of the active model frame, $AMF_t$, and an inactive model frame is performed, e.g. as shown in FIG. 7. On the other hand, if a "best" match is found, e.g. if a matching imaging metric is also below a given error threshold, then the matching representation $ε^j$ is retrieved from the data storage device 820 and is accessed by the registration engine 810. The registration engine 810 is then configured to instruct a similar alignment operation to that described in relation to FIG. 7; however, in the present case, the alignment is performed between the active model frame, $AMF_t$, and the matching representation $ε^i$. For example, components of an active model frame, e.g. $\hat{D}_t^\alpha$ and $\hat{C}_t^\alpha$ may be aligned with components of the matching representation $ε^j$, e.g. $ε_D^j$ and $ε_C^j$. In one case, an alignment metric may be evaluated and compared with a threshold to determine if alignment is to be performed, e.g. a low level of misalignment as compared to a predefined threshold is required to continue with the alignment. If alignment is not to be performed, the registration engine 810 may attempt to perform the alignment of active and inactive model frames as described with reference to FIG. 7. If alignment is to be performed, the registration engine 810 may be arranged to instruct a model deformer 840 to deform an existing three-dimensional model 850, e.g. determine a deformation in three-dimensions that acts to align the components of the active model frame with the components of the matching representation. In certain cases, following this alignment, which may be considered a "global loop closure", active and inactive portions of the three-dimensional model are not updated. This may be because the alignment brings the active and inactive portions into greater alignment such that the registration shown in FIG. 7 may be performed (e.g. such that a "local loop closure" may be successfully performed on a next frame). Not updating the portions also enables potentially inaccurate alignments to be corrected or recovered from in subsequent registration operations.

In the present example, the model deformer 840 is arranged to access the existing three-dimensional model 850 and deform this model using a deformation graph 860 to generate an aligned three-dimensional model 870. The deformation graph 860 comprises a set of nodes and edges that are associated with distributed positional elements of the existing three-dimensional model 850. In one case, each node may comprise: a timestamp; a position in three dimensions; a transformation definition; and a set of neighbours. The neighbours of each node make up the edges of the graph, which may be directed. In this manner, the deformation graph connects portions of the three-dimensional model that influence each other when a deformation of the model is performed. The number of neighbours may be limited, e.g. in one implementation to four neighbours. The transformation definition may comprise a definition of an affine transformation, e.g. as represented by a 3 by 3 matrix (initialised to the identity matrix) and a 3 by 1 vector (initialised to zero), or by dual quaternions. When performing the deformation, the transformation definition of each node may be optimised according to a set of surface constraints. When a deformation is applied a set of influencing nodes in the graph for a particular positional element of the three-dimensional model are identified. Based on this, a position of a positional element of the three-dimensional model may be deformed based on a weighted sum of the transformed influencing nodes, e.g. a weighted sum of the transformation definitions applied to each of the influencing nodes in accordance with a distance of a position of those nodes from the current positional element. When using a surface element model, e.g. as described with reference to FIGS. 6A and 6B, both the position and normal of a surface element may be deformed in this manner. For example, nodes in the deformation graph may be associated with surface elements based on their initialisation time. A list of these nodes may then be sorted by this timestamp. When a deformation is instructed for a surface element, a binary search may be performed through this list of nodes to populate a set of temporally nearby nodes. From this set, a set of k-nearest nodes are determined for the surface element based on a distance metric. These nodes are used then to deform the element. This process is quick and helps enable real-time or near real-time performance.

In one example, a deformation graph may be constructed on a frame-by-frame basis. In one particular case, a new deformation graph for the three-dimensional model may be constructed for each frame of image data. This may comprise determining the connectivity of the deformation graph, e.g. the set of neighbours for each graph node. In one case, a deformation graph is initialised using the three-dimensional model. For example, node positions for a frame may be determined from positions of positional elements within the three-dimensional model (e.g. p in the surfel model) and node timestamps may be set to positional element timestamps (e.g. the "Init_Time" of FIG. 6A). In one case, nodes for the deformation graph may be generated based on a sampling, such as a systematic sampling, of the positional elements in the three-dimensional model. This sampling may be uniformly distributed over the population, causing the spatial density of the deformation graph to mirror that of the three-dimensional model. The set of sampled nodes may be ordered based on the node timestamps. Following this, the connectivity of the deformation graph may be determined using time information. In one case, sets of nodes that are neighbours in time, e.g. based on the node timestamps, may be selected. For example, if there are four neighbours and a given node is being considered, nodes with the previous two timestamps (in a time-ordered list) and nodes with the subsequent two timestamps (in the list) may be selected as neighbours of the given node. This has an advantage of being computationally efficient and of preventing temporally uncorrelated areas of the three-dimensional model from influencing each other (e.g. preventing active areas influencing inactive areas). For example, a deformation graph associated with multiple passes of a common three-dimensional space may be complex and tangled within itself when considered spatially; however, ordering and considering the graph temporally allows the multiple passes to be disjoint and free to be aligned. This may be contrasted with comparative methods that determine graph connectivity based on pose times, e.g. in cases that use a pose graph.

An example process that may be applied by the model deformer 840 to use the deformation graph 860 to deform the existing three-dimensional model 850 to generate deformed model 870 will now be described in more detail. The model deformer 840 begins by accessing a given positional element of the existing three-dimensional model 850 (e.g. a surfel definition as described with reference to FIG. 6A or another voxel-based definition). As a first operation, the model deformer 840 locates a node of deformation graph 860 that is closest to the given positional element in time. The time separation is stored as a variable. Next the model deformer 840 locates temporally nearby nodes, e.g. moving away from the time separation for a predefined number of nodes to explore. These nearby nodes may then be sorted by a distance metric such as Euclidean distance with reference to the position of the given positional element. A given number of "neighbour" nodes, e.g. using the neighbour limit discussed above, may then be selected as the closest k nodes. A set of weights for each of these neighbours may then be generated based on a normalised distance between the node and the given positional element. The sum of the weights may also be determined. Then as a last operation the transformation definitions for the neighbours may be applied, as weighted via individual calculated weights for each neighbour and normalised by the sum of the weights. This may comprise applying the variables for the affine transformation discussed above with reference to the given positional element to deform a position and a normal vector of the given positional element. In the surface element case of FIG. 6A other aspects of the given positional element stay the same (e.g. may be copied to the deformed model 870).

In one example, the alignment performed by way of the registration engine 550, 760 or 810 is performed using the model deformer 840. In this example, this is achieved by optimising the parameters of the deformation graph 860. The optimisation may reflect a surface registration in the three-dimensional model given a set of surface correspondences that are set based on the output of the registration engine 550, 760 or 810. These surface correspondences may indicate that a particular source position at a first time is to reach or coincide with a particular destination position at a second time. Each individual surface correspondence may be either absolute (relating a deformed position to an absolute position in three-dimensional space) or relative (relating a deformed position to a different deformed position). When aligning active and inactive frames (e.g. as described with reference to FIG. 7) the source point may be representative of a point in an active model frame and the destination point may be representative of a point in an inactive model frame, which acts to align the active and inactive portions of the model. For example, the first time may comprise a time of initialisation for inactive model positional elements that are used to generate a given inactive model frame; the second time may be a current frame time; the source point may be a sampled positional element that is used to generate an active model frame (e.g. used to compute $\hat{D}_t^a$), as viewed based on the current pose estimate $P_t$; and the destination point may be a sampled positional element that is used to generate an active model frame (e.g. used to compute $\hat{D}_t^a$), as viewed based on the current pose estimate $P_t$ plus a defined transformation, H, in three dimensions. In this case the destination point is equivalent to a point in the inactive model frame, as you are applying the defined transformation (H) which was calculated to map active portions of the model onto inactive portions, e.g. the transformation is at least part of the alignment performed by registration engine 760 in FIG. 7. These surface correspondences may be used to apply a "local loop closure". Similarly, when aligning an active frame with a stored representation (e.g. as described with reference to FIG. 8): the first time may comprise a time of initialisation for the stored representation; the second time may be a current frame time; the source point may be a sampled positional element that is used to generate an active model frame (e.g. used to compute $\hat{D}_t^a$), as viewed based on the current pose estimate $P_t$; and the destination point may be a sampled positional element that is used to generate an active model frame (e.g. used to compute $\hat{D}_t^a$), as viewed based on a pose estimate for the representation plus a defined transformation, H, in three dimensions. Again, as the defined transformation is applied to the active model portions, the destination point is representative of an alignment of the active and inactive models. These surface correspondences may be used to apply a "global loop closure". The surface correspondences may be calculated for a sampled set of pixels, e.g. for the frames used. In these cases, the alignment or registration may comprise resolving the defined transformation in three dimensions for the set of surface correspondences.

In the above example, the surface correspondences may be used in one or more cost functions for the optimisation of the parameters of the deformation graph. For example, one cost function may comprise an error function equal to a sum of a distance error between a deformed source point (e.g. when applying the deformation graph) and a destination point, the source and destination points being those used in the surface correspondences. The temporal parameterisation of the three-dimensional model as described herein allows multiple passes of the same portion of three-dimensional space to be non-rigidly deformed into alignment allowing modelling to continue and new data fusion into revisited areas of the three-dimensional model. Another cost function may also be used to "pin" an inactive portion of the three-dimensional model into place, i.e. to deform the active portions of the model into the inactive portions. This cost function may comprise an error function equal to a sum of a distance error between a deformed source point (e.g. when applying the deformation graph) and a non-deformed destination point, the destination point being that used in the surface correspondences. Another cost function may also be used to keep previously registered areas of the three-dimensional model in place, i.e. when deforming a different area of the map, the relative positions of previously registered areas may need to be constrained to remain the same. This cost function may comprise an error function equal to a sum of a distance error between a deformed source point (e.g. when applying the deformation graph) and a deformed destination point. This cost function prevents loop closures and their associated deformations from pulling apart previously registered areas of the three-dimensional model. Error functions may also be defined to maximise rigidity in the defined transforms of the deformation graph (e.g. by minimising a distance metric between the transform multiplied by its transpose and the identity matrix) and to ensure a smooth deformation (e.g. based on a distance metric incorporating neighbour transforms). One or more of these described error functions may be minimised (e.g. within a weighted sum) to determine the transform definitions for the deformation graph. If one or more of the cost functions output an error value that is below a predefined threshold value (e.g. such as the cost function comparing deformed source and destination points), then an alignment is accepted; if the error value is above a predefined threshold value then the alignment is rejected (with the equality case being assigned appropriately).

Figure 9:
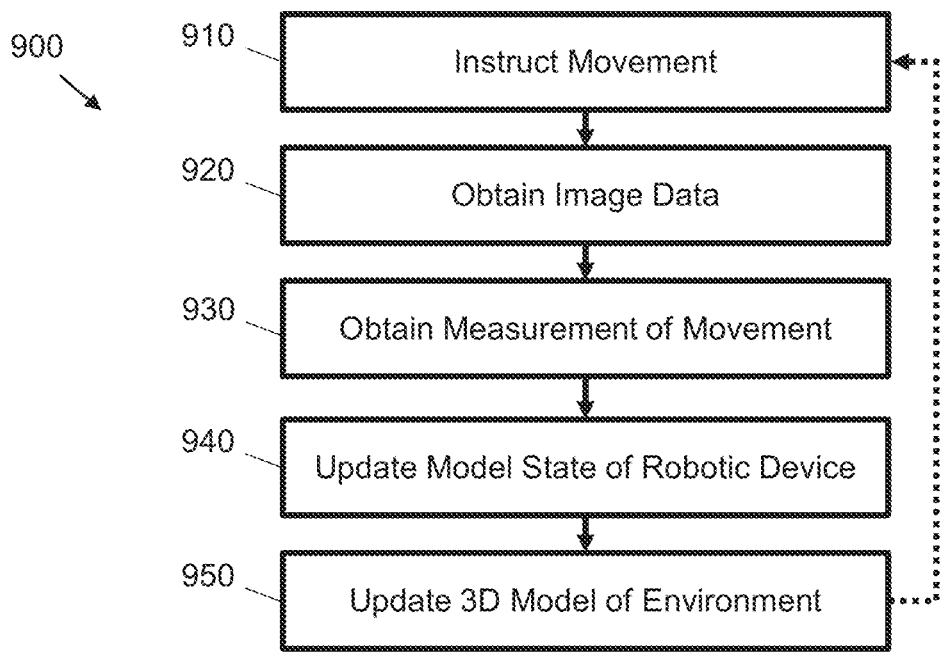
FIG. 9 is a flow diagram showing a method of updating a model of an environment according to an example.

FIG. 9 shows a method 900 of updating a three-dimensional model of an environment using a robotic device. The robotic device may be a robotic device 130, 160, 180, 190 as shown in FIGS. 1A to 1H, or a robotic device 310, 380 as shown in FIGS. 3A and 3B. In this example, the robotic device has a moveably-coupled image capture device, i.e. the image capture device is coupled to the robotic device in a manner that allows for movement of the image capture device with respect to the robotic device. For example, the image capture device may be mounted as shown and described with reference to FIGS. 1C, 1E and 1G. Alternatively, the method 900 may be performed with another example robotic device.

At block 910, a movement of at least one of the image capture device and the robotic device within the environment is instructed. For example, this may be by way of a movement controller such as movement controller 390 in FIG. 3B. The movement may be manually instructed, e.g. using a remote control, and/or be part of an autonomous movement, e.g. instructed by a navigation system of the robotic device. The movement may comprise moving just the robotic device, moving just the image capture device (e.g. using the moveable mount) or moving both the robotic device and the image capture device. In cases where the movement is performed iteratively different portions of the robotic device may be moved in each iteration, e.g. there may be an exploration phase where the robotic device moves within the environment and a scanning phase where the moveable mount is moved to move the image capture device. These phases may be periodically repeated.

At block 920, image data is obtained representing an observation of the environment with the image capture device. For example, this may comprise obtaining image data 220 as shown in FIGS. 2A to 2C. The image data may comprise a frame of depth data and/or photometric data.

At block 930, a measurement of the movement is obtained. This may comprise a measurement of one or more of the robotic device and the image capture device. The measurement may be obtained from a set of actuators such as robot actuators 332 and/or capture device actuators 334 as shown in FIG. 3B. In other cases, the measurement may be obtained from an observation of one or more of the robotic device and the image capture device. The measurements may be obtained from one or more motors, such as drive motors for locomotion components and/or joint motors for an articulated capture device mount.

At block 940, a model state of the robotic device is updated. The model state may comprise a state of the robotic device, e.g. as described with reference to state 360 of FIGS. 3A and 3B. The model state may be represented using pose data that defines a pose of one or more of the robotic device and the image capture device. For example, the model state may comprise data defining the previously-described transformations $T_{WC}$ and $T_{WB}$. In one case, block 920 comprises obtaining a frame of video data and the model state is determined for both a current frame of video data and a previous frame of video data. In this case, block 940 may comprise determining a previous model state and a current model state, e.g. the current and previous states 450, 460 in FIG. 4A. Block 940 may be seen as a tracking operation for the robotic device. In this case, the tracking operation uses the measurements of the movements to refine the model state. The updating at block 940 comprises optimising a function of the model state and the measurement of the movement. For example, this may comprise constraining an update for the model state based on the measurement of the movement. Block 940 may comprise operations similar to those described with respect to the state engine 440 of FIG. 4A.

At block 950, the three-dimensional model of the environment is updated based on a comparison of the image data and the three-dimensional model. This comparison uses the updated model state from block 940. The comparison comprises a projection using the updated model state, e.g. either a back-projection of the image data from block 920 onto the three-dimensional model or a projection of the three-dimensional model onto a plane associated with a current pose of the image capture device. The comparison may thus be made in two-dimensional image space or in the three-dimensional model space. The updating of the three-dimensional model may comprise operations similar to those described with respect to FIGS. 5, 7 and 8.

In certain cases, block 910 comprises one or more of instructing a first set of actuators to move the robotic device within the environment and instructing a second set of actuators to move the image capture device with respect to the robotic device. In this case, block 930 comprises obtaining odometry data from the first set of actuators and obtaining kinematics data from the second set of actuators.

As described in relation to the state engine 440 of FIG. 4A, updating the model state of the robotic device may comprise optimising a cost function. The cost function may comprise a set of selectable error terms. In one case, the cost function comprises an error term associated with a kinematic error and an error term associated with an odometric error. In this case, the kinematic error comprises a comparison of the spatial relationship between the image capture device and the robotic device and a kinematic measurement from the robotic device. For example, the spatial relationship may be modelled using forward kinematics as applied to a moveable mount for the image capture device. The odometric error may comprise a comparison of a change in the spatial relationship between the robotic device and the three-dimensional model of the environment and odometry data from the robotic device. The odometry data may be provided by a drive system for the robotic device.

In certain cases, the cost function comprises an error term associated with a linear prior. The linear prior may be constructed using error values and the model state of the robotic device from a previous update operation. In certain cases, block 940 comprises optimising a previous state of the robotic device and a current state of the robotic device. In certain cases, the cost function comprises an error term associated with a geometric alignment error. In this case, the geometric alignment error may comprise a comparison of data derived from the obtained image data and the three-dimensional model using the model state of the robotic device before block 940. Example error terms may comprise the error terms described with reference to FIG. 4A.

Figure 10:
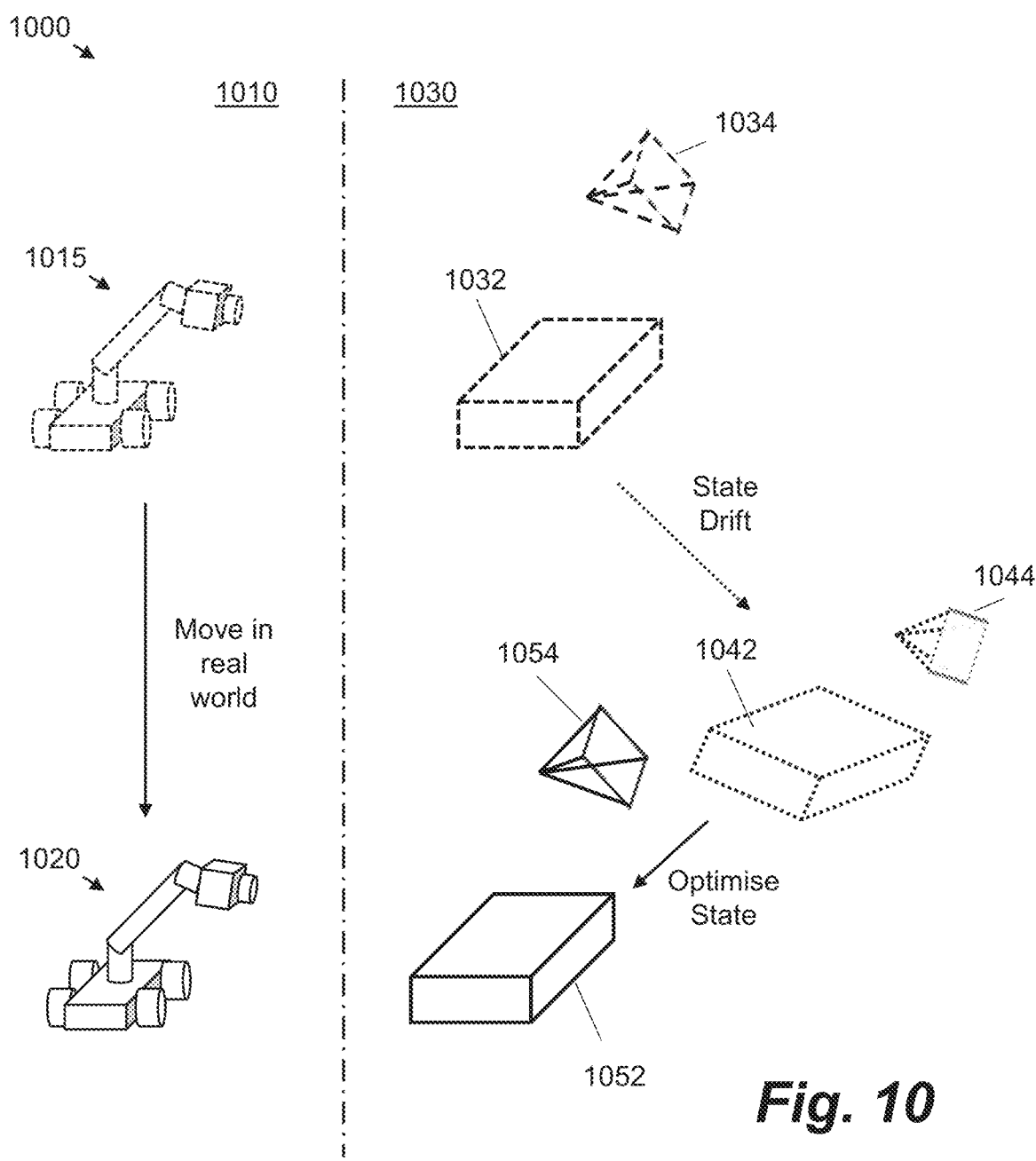
FIG. 10 is a schematic diagram showing a movement of a robotic device and a correction of drift in model space using state optimisation according to an example.
Figure 11:
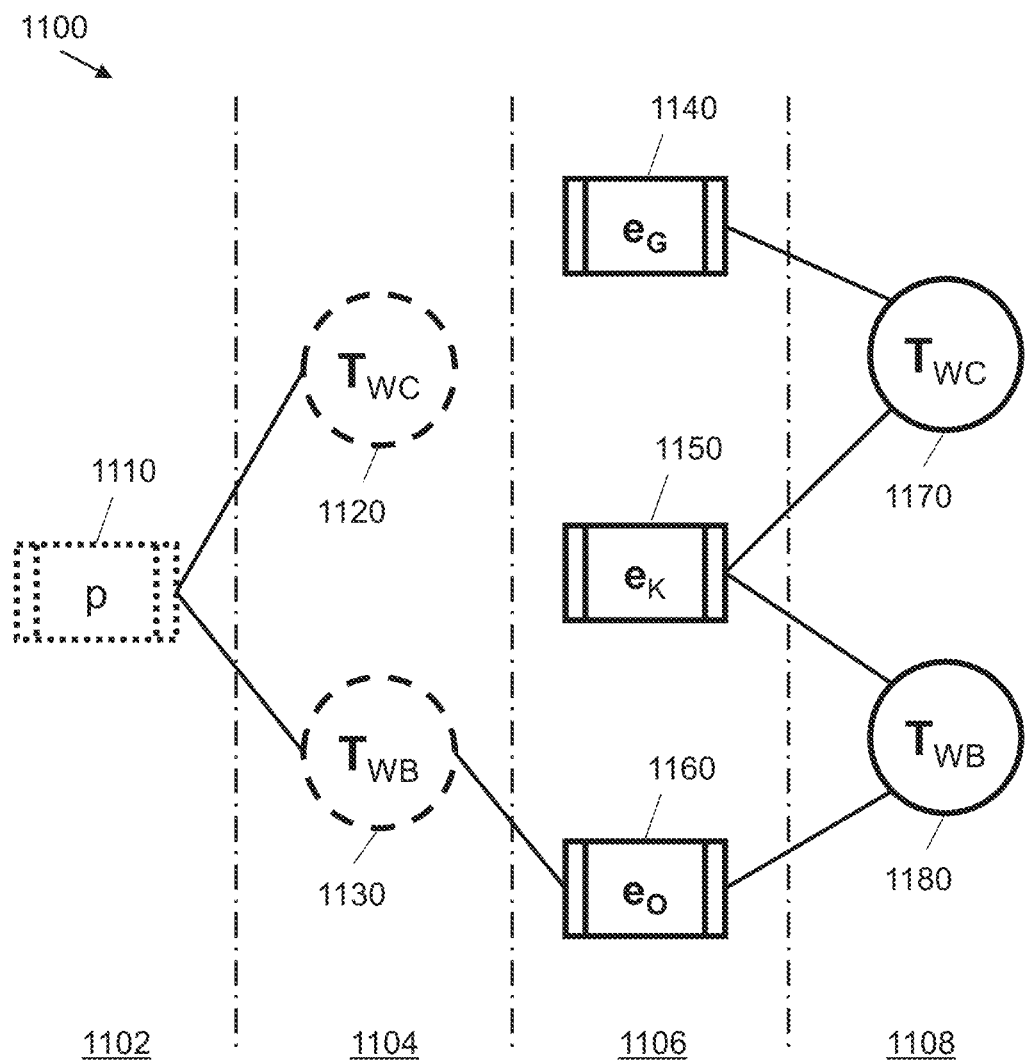
FIG. 11 is a state graph for state optimisation according to an example.

FIGS. 10 and 11 provide an example of a state update, e.g. as performed using the robotic devices 310, 380 of FIGS. 3A and 3B, the state engine 440 of FIG. 4A and/or using the method 900 of FIG. 9. FIG. 10 shows an example 1000 of a movement in the real world and a corresponding change in a state of the robotic device. FIG. 11 shows an example of how a state may be modelled.

In FIG. 10, the left-hand portion 1010 shows a robotic device that is moved from a first position 1015 in an environment to a second position 1020 in the environment. The robotic device in the present example is the robotic device of FIGS. 1C and 1D. The movement may comprise one or more of movement of the chassis of the robotic device and movement of the image capture device, e.g. via movement of the arm that couples the image capture device to the chassis.

The right-hand portion 1030 of FIG. 10 shows a state of the robotic device in a model space, e.g. using the conventions set out with respect to FIG. 1D. At the first position 1015, the robotic device has a state as represented by data defining a pose of the chassis 1032 and data defining a pose of the image capture device 1034, both poses being defined with respect to the model space.

FIG. 10 shows how the state of the robotic device in model space may drift when using comparative methods. For example, model drift may occur as shown by data defining the pose of the chassis 1042 and data defining the pose of the image capture device 1044 in FIG. 10. Model drift may occur if kinematic and odometric measurements are used without state optimisation, e.g. without an additional geometric error term. Similarly, model drift may also occur using a combined photometric and geometric error without making use of kinematic and odometric measurements, e.g. by matching a frame of video data from the image capture device with a model of the environment. In the present examples, the use of movement measurements within a state optimisation procedure helps the state in model space to more accurately reflect the real-world configuration of the robotic device. Hence, in FIG. 10, data defining the pose of the chassis 1052 following a state optimisation and data defining the pose of the image capture device 1054 following the state optimisation are shown, e.g. following an operation performed by the state engine 440 of FIG. 4A. This data 1052, 1054 more accurately reflects the second position 1020 of the robotic device. This increased accuracy is particularly useful for complex combinations of movements of the image capture device and the robotic device, where comparative approaches may easily drift and "lose" a current position and orientation of the robotic device and a coupled image capture device.

FIG. 11 shows an example state graph 1100 for two states of a robotic device. The state graph 1100 is split into four portions 1102 to 1108. The first portion 1102 represents prior components, the second portion 1104 represents components of a previous state, the third portion 1106 represents error components and the fourth portion 1108 represents components of a current state. The first portion 1102 shows a linear prior 1110. The linear prior 1110 is used to constrain the previous state, in particularly a pose of the image capture device 1120 and a pose of the robotic device 1130. Each pose is represented using the transformations described with reference to FIG. 4B (e.g. $Tw_B$ and $T_{WC}$). The error components of the third portion 1106 comprise a geometric error term 1140, a kinematic error term 1150 and an odometric error term 1160. For example, these error terms may correspond to the error terms 410 to 430 in FIG. 4A. The odometric error term 1160 is used to constrain the pose of the robotic device 1130 in the previous state and a pose of the robotic device 1180 in the current state (as shown in the fourth portion 1108). The kinematic error term 1150 is used to constrain the pose of the robotic device 1180 in the current state and a pose of the image capture device 1170 in the current state. Lastly, the geometric error term 1140 is also used to constrain the pose of the image capture device 1170 in the current state.

In the example of FIG. 11, the previous state and the current state may relate to previous and current frames of video data obtained from the image capture device. After a new "current" frame of video is received, values for the poses for the previous and current frames may be determined via a state optimisation operation. The error components of the third portion 1106 may be based on measurements made from subsystems of the robotic device, e.g. electro-mechanical control systems. The linear prior 1110 may be obtained from marginalisation of states and errors from previous time iterations. The state graph may thus be used to construct a sliding-window optimisation problem that may be iteratively solved to determine values for the previous state and current state.

Certain examples described herein allow for tight coupling of kinematic and odometric data from a mobile robotic device within mapping systems such as dense SLAM systems. The examples may be implemented in real-time or near real-time on a wide variety of robotic devices that feature up to six degrees of freedom for the robotic device (e.g. for a "body", "core" or "chassis" of a robot) and for an image capture device coupled to the robotic device (e.g. on an "arm" or "head" of a robot). Certain examples described herein jointly optimise a state model to estimate the pose of the robotic device and the image capture device. This joint optimisation may comprise one or more of kinematic error terms, odometric error terms, geometric error terms and a linear prior representing previous states and errors.

Certain examples described herein enable a dense three-dimensional model of an environment to be built in real-time or near real-time as a robotic device navigates an environment. The use of a moveable image capture device allows for more efficient and flexible mapping of an environment, with particular applicability for mapping constrained environments, such as living spaces and/or disaster or conflict zones. In certain examples, the three-dimensional model uses active areas to achieve tight local loop closures. This may be with respect to a surface when using a surface element model. In the event of active portions of the model drifting too far from inactive portions for a local alignment to converge, an appearance-based global loop closure method may be used to bootstrap a deformation that realigns the active portions of the model with the underlying inactive portions for tight global loop closure and model consistency, e.g. with respect to surfaces of the model.

Performance of implementations of the described examples is comparable to comparative approaches for simple and smooth camera trajectories while providing substantial improvements for challenging motion and visual data, such as fast erratic motion with rapid rotations. The examples described herein also provide improved mapping for areas that lack significant photometric and geometric variation, such as walls and floors of common colouring (e.g. where a camera observes a tiled ceiling or carpeted floor). In comparative approaches the lack of informative image data may lead to large model drift, e.g. as shown in FIG. 10.

Figure 12:
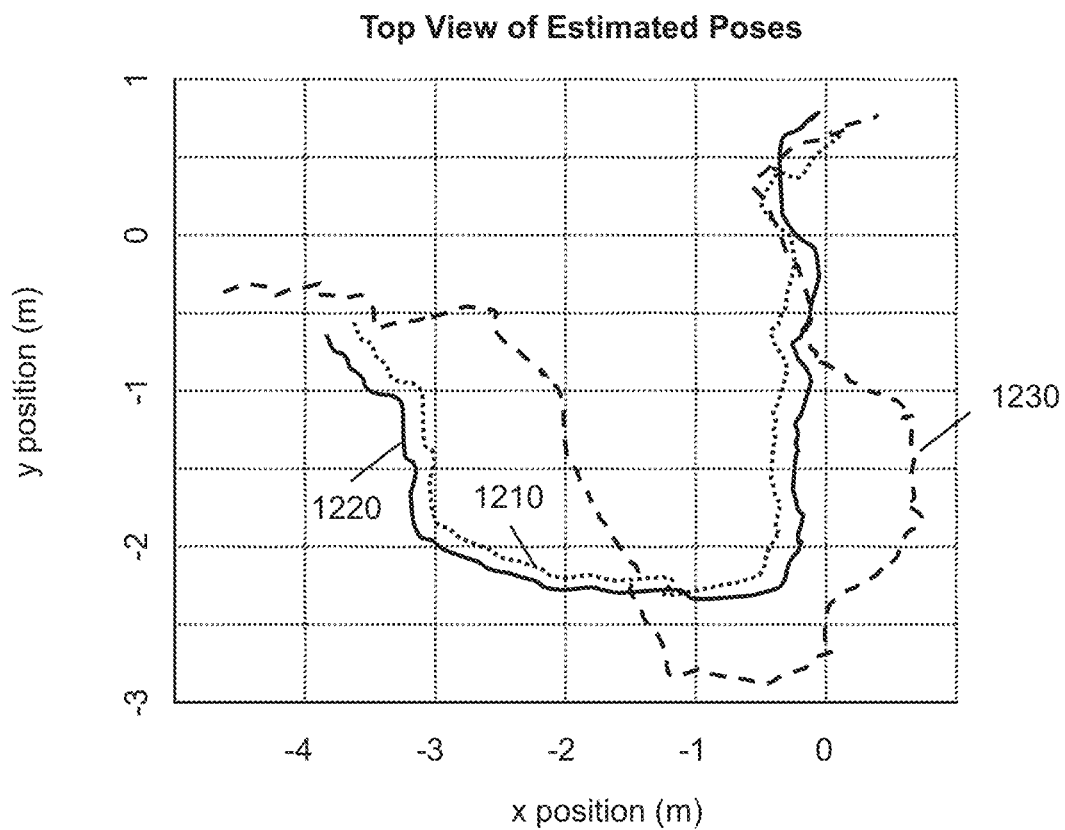
FIG. 12 is a chart illustrating an example mapping performance.

Certain examples described herein provide improvements for quantitative tracking accuracy, e.g. as compared to a ground truth measurement, and qualitative reconstruction consistency. FIG. 12 shows example test data that demonstrates these improvements. FIG. 12 shows a two-dimensional top view of an environment. In the test case the environment was a room of around 5 metres by 5 metres. Line 1210 represents a "ground truth" path of a robotic device, i.e. an actual path of the robotic device measured independently of the systems and methods described herein. Line 1220 then represents a modelled position of the robotic device as modelled by the state optimisation examples described herein, e.g. by applying the components shown in FIG. 3A, 3B or 4A. Line 1230 then shows a modelled position of the robotic device using a comparative system that tracks position by minimising a combined geometric and photometric error, e.g. without the kinematic and odometric error terms described herein. As can be seen, the line 1220 closely matches the line 1210 but the line 1230 varies from the line 1210 in several places. In this test case, the comparative system struggled to maintain an accurate trajectory during fast rotations, especially where the image data lacked variation. In contrast, the examples described herein were able to make use of onboard measurements from the robotic device to aid navigation.

Certain examples described herein enable robust and consistent maps to be generated when using SLAM systems without a pose graph. For example, the present examples may be used to improve pose-graph-free SLAM systems, where without the constraints of the kinematic and odometric measurements three-dimensional models may become warped in a manner that deviates from actual "ground truth" geometry. The present examples thus improve dense visual SLAM methods that map the three-dimensional structure of an environment and locate the robotic device within the generated structure. Examples described herein may also allow objects that are repeatedly viewed to be more accurately positioned in a global model of the environment. The model may also show improved local consistency.

Certain examples described herein provide improvements over comparative methods that use inertial measurements, such as those provided by an IMU. These methods are prone to global drift due to noise and biases in the inertial measurements. This drift may be due to the dependence on accelerometer measurements and IMU biases. For example, certain comparative systems may use extended Kalman filters to estimate a transformation between pairs of images (e.g. consecutive video frames).

Certain examples described herein make use of kinematic and odometric measurements that may be available "for free" when using a mobile robotics platform. For example, wheeled robots often provide accessible odometry data and manipulator kinematics may be computed as part of the manipulator control process. Predictions that are made using data from moveable mounts, such as those based on common manipulators, may be based on direct joint angle measurements, which can reduce drift, as found with inertial systems, while still providing robustness improvements. Mounting an image capture device at an end-effector position on a manipulator has also been shown to provide improvements when mapping an environment. Relative odometric measurements may be used to optimise both current and past states. The examples described herein are able to be implemented at real-time frame rates (e.g. 30 frames-per-second) and so are a good fit with fast SLAM systems such as those without a pose graph and flexible deformation operations on a surfel model.

Figure 13:
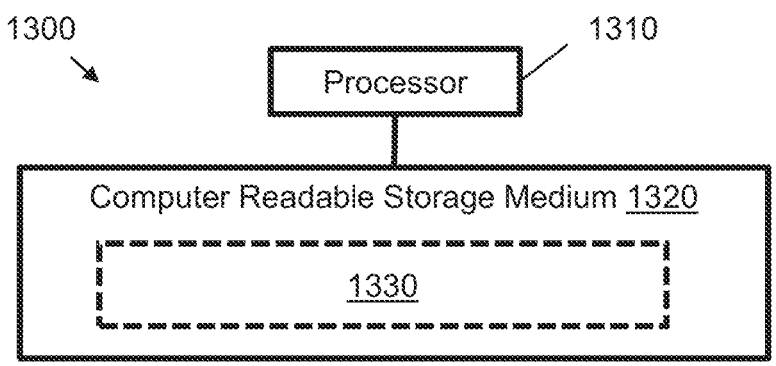
FIG. 13 is a schematic diagram showing a non-transitory computer readable medium according to an example.

Certain system components and methods described herein may be implemented by way of computer program code that is storable on a non-transitory storage medium. FIG. 13 shows a particular example 1300 of a system comprising at least one processor 1310 arranged to retrieve data from a computer-readable storage medium 1320. The system may comprise part of a mobile robotic device as described above. The computer-readable storage medium 1320 comprises a set of computer-readable instructions 1330, stored thereon. The instructions 1330 are arranged to cause the at least one processor 1310 to perform a series of actions. These actions may comprise the method 900 of FIG. 9 or its variations, and/or the actions of the state engine 440 as described with reference to FIG. 4A.

The above examples are to be understood as illustrative. Further examples are envisaged. Although certain components of each example have been separately described, it is to be understood that functionality described with reference to one example may be suitable implemented in another example, and that certain components may be omitted depending on the implementation. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

What is claimed is:

1. A mapping system for a robotic device, the robotic device comprising one or more actuators to move the robotic device within an environment and a moveable mount for an image capture device, the mapping system comprising:
    a state engine to jointly optimise a current state of the robotic device and a previous state of the robotic device based on a kinematic error, an odometric error and a geometric error,
    wherein each state of the robotic device comprises data indicating a pose of the robotic device with respect to a model of the environment and data indicating a pose of the image capture device with respect to the model,
    wherein the kinematic error comprises a function of a kinematic measurement associated with the moveable mount and a pose of the image capture device with respect to the robotic device derived from the current state,
    wherein the odometric error comprises a function of an odometry measurement associated with the one or more actuators and an odometric difference between the current state and the previous state,
    wherein the geometric error comprises a comparison of image data from the capture device and the model of the environment, the comparison using a projection based on the current state,
    wherein the mapping system is configured to update the model using the current state following optimisation by the state engine.

2. The mapping system of claim 1, wherein the moveable mount comprises a plurality of joints and the pose of the image capture device with respect to the robotic device is determined using forward kinematics.

3. The mapping system of claim 1, wherein the pose of the robotic device with respect to the model and the pose of the image capture device with respect to the model are defined within six degrees of freedom.

4. The mapping system of claim 1, wherein the state engine is configured to jointly optimise the current state and the previous state using a linear prior comprising a Jacobian matrix and a set of residuals, the state engine being configured to update the linear prior for use in a subsequent optimisation iteration based on a marginalisation of the kinematic error, the odometric error, the geometric error and the previous state.

5. The mapping system of claim 4, wherein the mapping engine is configured to use a deformation graph to align a first set of portions of the model with a second set of portions of the model, the deformation graph indicating a set of neighbours for a given position in the model that are to be used to modify the model at the given position during alignment.

6. The mapping system of claim 5, wherein the mapping engine is configured to align the first set of portions of the model with the second set of portions of the model during a loop closure, wherein, following the loop closure, the linear prior and the previous state are reinitialised.

7. The mapping system of claim 1, wherein the model comprises a surface element model, wherein each surface element in the surface element model comprises at least data defining a position of the surface element in three-dimensions and data defining a normal vector for the surface element in three-dimensions, wherein each surface element represents a two-dimensional area in a three-dimensional space.

8. The mapping system of claim 1, wherein the mapping system is configured to generate the model without a pose graph for the image capture device.

9. A robotic device comprising:
    an image capture device;
    a movable mount on which the image capture device is moveably mounted with respect to the robotic device;
    one or more actuators to move one or more of the robotic device and the image capture device with respect to an environment;
    a state engine to update a state of the robotic device; and
    a mapping engine to generate a three-dimensional model of the environment using the state of the robotic device,
    wherein the state of the robotic device comprises at least a transformation of the image capture device with respect to the three-dimensional model,
    wherein the state engine is configured to update the state of the robotic device based on a comparison of the state of the robotic device and measurements obtained from the one or more actuators,
    wherein the mapping engine is configured to compare an image from the image capture device with the three-dimensional model based on the state of the robotic device to update the three-dimensional model,
    wherein the state of the robotic device is a current state of the robotic device, and
    wherein to update the current state of the robotic device, the state engine is configured to jointly optimise the current state of the robotic device and a previous state of the robotic device based at least in part on a kinematic error,
    wherein the kinematic error comprises a function of a kinematic measurement associated with the movable mount and a pose of the image capture device with respect to the robotic device derived from the current state.

10. The robotic device of claim 9, wherein the mapping engine is configured to determine an iterative-closest-point error, and wherein the state engine is configured to additionally use the iterative-closest-point error to update the state of the robotic device.

11. The robotic device of claim 9, wherein the one or more actuators comprise:
    a first set of actuators to move the robotic device with respect to the environment, and
    a second set of actuators to move the image capture device with respect to the robotic device,
    wherein the state of the robotic device further comprises a transformation of the robotic device with respect to the three-dimensional model.

12. The robotic device of claim 11, wherein the first set of actuators provide a plurality of degrees of freedom between the robotic device and the environment and wherein the second set of actuators provide a plurality of degrees of freedom between the image capture device and the robotic device.

13. The robotic device of claim 9, wherein the image capture device is configured to output colour image data and a depth map, and the mapping engine is configured to use the colour image data and the depth map to update the three-dimensional model.

14. A method of updating a three-dimensional model of an environment using a robotic device having a moveably-coupled image capture device, the method comprising:
instructing a movement of at least one of the image capture device and the robotic device within the environment;
obtaining image data representing an observation of the environment with the image capture device;
obtaining a measurement of the movement;
updating a model state of the robotic device, the model state of the robotic device comprising pose data for the robotic device and the image capture device, the updating comprising optimising a function of the model state and the measurement of the movement,
wherein the model state of the robotic device is a current model state of the robotic device, and
wherein updating the model state of the robotic device comprises jointly optimising the current model state of the robotic device and a previous model state of the robotic device based at least in part on a kinematic error,
wherein the kinematic error comprises a comparison of (i) a spatial relationship between the image capture device and the robotic device, and (ii) a kinematic measurement from the robotic device; and
updating the three-dimensional model of the environment based on a comparison of the image data and the three-dimensional model using the updated model state, the comparison comprising a projection using the updated model state.

15. The method of claim 14, wherein the pose data comprises a transformation of the robotic device with respect to the three-dimensional model and a transformation of the image capture device with respect to at least one of the robotic device and the three-dimensional model.

16. The method of claim 14, wherein instructing a movement comprises one or more of:
instructing a first set of actuators to move the robotic device within the environment; and/or
instructing a second set of actuators to move the image capture device with respect to the robotic device, and
wherein obtaining a measurement of movement from the robotic device comprises one or more of:
obtaining odometry data from the first set of actuators; and/or
obtaining kinematics data from the second set of actuators.

17. The method of claim 14, wherein updating the model state of the robotic device and the image capture device comprises:
optimising a cost function, the cost function comprising an error term associated with the kinematic error and an error term associated with an odometric error,
and
wherein the odometric error comprises a comparison of a change in the spatial relationship between the robotic device and the three-dimensional model of the environment and odometry data from the robotic device.

18. The method of claim 17, wherein the cost function comprises an error term associated with a linear prior comprising a Jacobian matrix and a set of residuals, the method comprising updating the linear prior for use in a subsequent optimisation iteration based on a marginalisation of the previous model state, the error term associated with the kinematic error, and the error term associated with the odometric error.

19. The method of claim 17, wherein the cost function comprises an error term associated with a geometric alignment error, wherein the geometric alignment error comprises a comparison of depth data derived from the obtained image data and the three-dimensional model using the model state of the robotic device before the updating.

20. A non-transitory computer-readable storage medium comprising computer-executable instructions which, when executed by a processor, cause a computing device to perform the method of claim 14.

* * * * *